United States Patent
Oh et al.

(10) Patent No.: US 10,528,619 B2
(45) Date of Patent: Jan. 7, 2020

(54) IMAGE DISPLAY METHOD AND DEVICE

(71) Applicant: Samsung Electronics Co., Ltd., Gyeonggi-do (KR)

(72) Inventors: Hun-Cheol Oh, Seoul (KR); Soo-Hyung Kim, Gyeonggi-do (KR); Byoung-Tack Roh, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 281 days.

(21) Appl. No.: 14/904,503

(22) PCT Filed: Jul. 11, 2014

(86) PCT No.: PCT/KR2014/006265
§ 371 (c)(1),
(2) Date: Jan. 12, 2016

(87) PCT Pub. No.: WO2015/005728
PCT Pub. Date: Jan. 15, 2015

(65) Prior Publication Data
US 2016/0147792 A1    May 26, 2016

(30) Foreign Application Priority Data

Jul. 12, 2013 (KR) ........................ 10-2013-0082518

(51) Int. Cl.
*G06F 17/30* (2006.01)
*G06F 16/583* (2019.01)
(Continued)

(52) U.S. Cl.
CPC ........ *G06F 16/5838* (2019.01); *G06F 3/0482* (2013.01); *G06F 3/04842* (2013.01);
(Continued)

(58) Field of Classification Search
CPC ......... G06F 17/30256; G06F 17/30277; G06F 17/30; G06F 17/00; G06F 16/5838; G06F 16/24578; G06F 16/532; G06F 16/248
(Continued)

(56) References Cited

U.S. PATENT DOCUMENTS

2003/0184562 A1* 10/2003 Matsumoto ............ H04N 5/272
                                                                345/620
2006/0008145 A1*  1/2006 Kaku ................. G06K 9/00228
                                                                382/173
(Continued)

FOREIGN PATENT DOCUMENTS

KR    10-2009-0003939 A    1/2009
KR    10-2009-0118674 A   11/2009
(Continued)

*Primary Examiner* — Isaac M Woo
(74) *Attorney, Agent, or Firm* — Cha & Reiter, LLC.

(57) ABSTRACT

Various embodiments of the present invention relate to a device for displaying an image through the recognition of an object displayed on the screen of an electronic device, wherein the device for displaying an image includes: a storage unit storing a plurality of image files; a display unit displaying an image, corresponding to each image file stored in the storage unit, on the screen of the electronic device and changing an image, currently displayed according to an input by an input unit or the setting of an automatic screen change function, to another image stored in the storage unit; and a control unit enabling images, not including a selected object from among images of a plurality of image files stored in the storage unit, to not be displayed on the display unit, according to the selection of a specific object in an image displayed on the screen.

11 Claims, 16 Drawing Sheets

(51) Int. Cl.
*G06F 16/248* (2019.01)
*G06F 16/2457* (2019.01)
*G06F 21/30* (2013.01)
*G06F 3/0482* (2013.01)
*G06F 3/0484* (2013.01)
*G06K 9/00* (2006.01)
*G06F 16/532* (2019.01)

(52) U.S. Cl.
CPC ...... *G06F 16/248* (2019.01); *G06F 16/24578* (2019.01); *G06F 16/532* (2019.01); *G06F 21/30* (2013.01); *G06K 9/00228* (2013.01); *G06K 9/00288* (2013.01); *G06K 9/00362* (2013.01)

(58) Field of Classification Search
USPC .................................................. 707/600–899
See application file for complete search history.

(56) References Cited

U.S. PATENT DOCUMENTS

| | | | |
|---|---|---|---|
| 2009/0303338 A1* | 12/2009 | Chaurasia | H04N 5/2624 348/222.1 |
| 2011/0069823 A1 | 3/2011 | Chen et al. | |
| 2013/0044921 A1 | 2/2013 | In et al. | |
| 2015/0286896 A1* | 10/2015 | Watanabe | G06F 17/30247 382/103 |

FOREIGN PATENT DOCUMENTS

| | | |
|---|---|---|
| KR | 10-2010-0000936 A | 1/2010 |
| KR | 10-2010-0001064 A | 1/2010 |
| KR | 10-2011-0083025 A | 7/2011 |
| KR | 10-2011-0128574 A | 11/2011 |
| KR | 10-2013-0020065 A | 2/2013 |
| WO | 2009/004524 A1 | 1/2009 |

\* cited by examiner

IMAGE DISPLAY METHOD AND DEVICE

This application makes reference to and claims all benefits from an application entitled IMAGE DISPLAY METHOD AND DEVICE filed in the Korean Intellectual Property Office on Jul. 11, 2014 and there duly assigned PCT/KR2014/006265, which in turn claims a priority to an earlier Korean Patent Application No. 10-2013-0082518 filed on Jul. 12, 2013.

TECHNICAL FIELD

Various embodiments of the present invention relate to an electronic device, and more particularly, to a method and apparatus for displaying images.

BACKGROUND ART

Lately, as electronic devices (for example, mobile devices) are providing more various kinds of services and additional functions, many electronic devices are providing a Graphic User Interface (GUI) based on a touch screen. In order to increase the effective value of such a mobile device and satisfy user's various demands, various kinds of applications (application software programs) executable in a mobile device are being developed.

A mobile device can store basic applications developed by the mobile device's manufacturing company and installed therein, and additional applications downloaded from application sales web sites through the Internet, and execute the applications. The additional applications may have been developed by general developers and then registered in the application sales web sites.

Meanwhile, many electronic devices including the mobile device are also providing various kinds of image viewer applications for displaying stored images such as pictures on a screen so that a user can view the stored images.

DISCLOSURE

Technical Problem

Stored images may include images that a user does not want to view. However, since image display methods according to the related art sequentially display all images included in a selected category on a screen, the user has no choice but to view images that he/she does not want to view.

Also, when the user views the stored images together with other people through the electronic device, he/she may not want to show some of the stored images to the other people. However, typical applications show all the stored image as they are.

Various embodiments of the present disclosure provide a method and apparatus for enabling a user to select one or more images including a specific object from among a plurality of images to view the selected images, in an electronic device.

Technical Solution

In order to overcome the problem, in accordance with an embodiment of the present invention, there is provided an apparatus of displaying an image through recognition of an object displayed on a screen of an electronic device, the apparatus including: a storage unit configured to store a plurality of image files; a display unit configured to display an image corresponding to each image file stored in the storage unit on a screen of the electronic device, and to convert the displayed image to another image stored in the storage unit according to an input by input means or setting of an automatic screen conversion function to display the converted image; and a controller configured to prevent, if a specific object included in the image displayed on the screen is selected, images not including the selected object among images of the plurality of image files stored in the storage unit from being displayed on the display unit.

If the specific object is selected, the display unit may display, on a screen, function selecting means for executing a function for preventing the images not including the selected object from being displayed on the display unit.

The function selecting means may be in the form of a menu window including a function selection menu for at least one function related to processing of an image displayed on the display unit.

The specific object included in the image displayed on the screen may be selected when a specific area in the image is selected by input means to select at least one object included in the selected area.

The specific object included in the image displayed on the screen may be selected when one or more objects included in the image displayed on the screen are detected, areas of the detected objects are displayed on the image, and an area is selected from among the displayed areas of the detected objects.

The selected object may be a human's face.

According to another embodiment of the present disclosure, there is provided an apparatus of displaying an image through recognition of an object displayed on a screen of an electronic device, the apparatus including: a storage unit configured to store a plurality of image files; a display unit configured to display an image corresponding to each image file stored in the storage unit on a screen of the electronic device, and to convert the displayed image to another image stored in the storage unit according to an input by input means or setting of an automatic screen conversion function to display the converted image; and a controller configured to prevent, if a specific object included in the image displayed on the screen is selected, images including the selected object among images of the plurality of image files stored in the storage unit from being displayed on the display unit.

If the specific object is selected, the display unit may display, on a screen, function selecting means for executing a function for preventing the images including the selected object from being displayed on the display unit.

The function selecting means may be in the form of a menu window including a function selection menu for at least one function related to processing of an image displayed on the display unit.

The specific object included in the image displayed on the screen may be selected when a specific area in the image is selected by input means to select at least one object included in the selected area.

The specific object included in the image displayed on the screen may be selected when one or more objects included in the image displayed on the screen are detected, areas of the detected objects are displayed on the image, and an area is selected from among the displayed areas of the detected objects.

The selected object may be a human's face.

According to another embodiment of the present disclosure, a method of displaying an image through recognition of an object displayed on a screen of an electronic device, the method including: displaying an image corresponding to each image file of a plurality of image files stored in a storage unit, on a screen of the electronic device; selecting a specific object included in the image displayed on the screen; and converting the displayed image to another image stored in the storage unit according to an input by input means or setting of an automatic screen conversion function, and displaying the converted image, wherein the displaying of the converted image includes preventing images not including the selected object among images of the plurality of image files stored in the storage unit from being displayed on the display unit.

The method may further include, after the specific object is selected, displaying, on a screen, function selecting means for executing a function for preventing images not including the selected object from being displayed on the display unit.

The function selecting means may be in the form of a menu window including a function selection menu for at least one function related to processing of an image displayed on the display unit.

The specific object included in the image displayed on the screen may be selected when a specific area in the image is selected by input means to select at least one object included in the selected area.

The specific object included in the image displayed on the screen may be selected when one or more objects included in the image displayed on the screen are detected, areas of the detected objects are displayed on the image, and an area is selected from among the displayed areas of the detected objects.

The selected object may be a human's face.

According to another embodiment of the present disclosure, a method of displaying an image through recognition of an object displayed on a screen of an electronic device, the method including: displaying an image corresponding to each image file of a plurality of image files stored in a storage unit, on a screen of the electronic device; selecting a specific object included in the image displayed on the screen; and converting the displayed image to another image stored in the storage unit according to an input by input means or setting of an automatic screen conversion function, and displaying the converted image, wherein the displaying of the converted image includes preventing images including the selected object among images of the plurality of image files stored in the storage unit from being displayed on the display unit.

The method may further include, after the specific object is selected, displaying, on a screen, function selecting means for executing a function for preventing the images including the selected object from being displayed on the display unit.

The function selecting means may be in the form of a menu window including a function selection menu for at least one function related to processing of an image displayed on the display unit.

The specific object included in the image displayed on the screen may be selected when a specific area in the image is selected by input means to select at least one object included in the selected area.

The specific object included in the image displayed on the screen may be selected when one or more objects included in the image displayed on the screen are detected, areas of the detected objects are displayed on the image, and an area is selected from among the displayed areas of the detected objects.

The selected object may be a human's face.

Meanwhile, information about the method of displaying the image through recognition of the object displayed on the screen of the electronic device may be stored in computer-readable recording medium. The recording medium may include all kinds of recording media capable of storing programs and data that is readable by computer system. Examples of the recording medium are Read Only Memory (ROM), Random Access Memory (RAM), Compact Disk (CD), Digital Video Disk (DVD)-ROM, magnetic tape, floppy disk, an optical data storage device, and an embedded multimedia card (eMMC). Also, the recording medium may be implemented in the form of carrier waves (for example, transmission through the Internet). Also, the recording medium may be distributed in computer system connected through a network so that computer-readable codes can be stored and executed in a distributed manner.

Advantageous Effects

According to the embodiments of the present disclosure, a user can view images including a person or object that he/she wants to view among stored images through an electronic device such as a smart phone including screen display means, which leads to convenience in viewing images such as pictures through the electronic device.

Also, according to the embodiments of the present disclosure, a user can exclude images including a person or object that he/she does not want to view from stored images to view images that he/she wants to view through an electronic device such as a smart phone including screen display means, which also leads to convenience in viewing images such as pictures through the electronic device.

MODE FOR INVENTION

Figure 1:
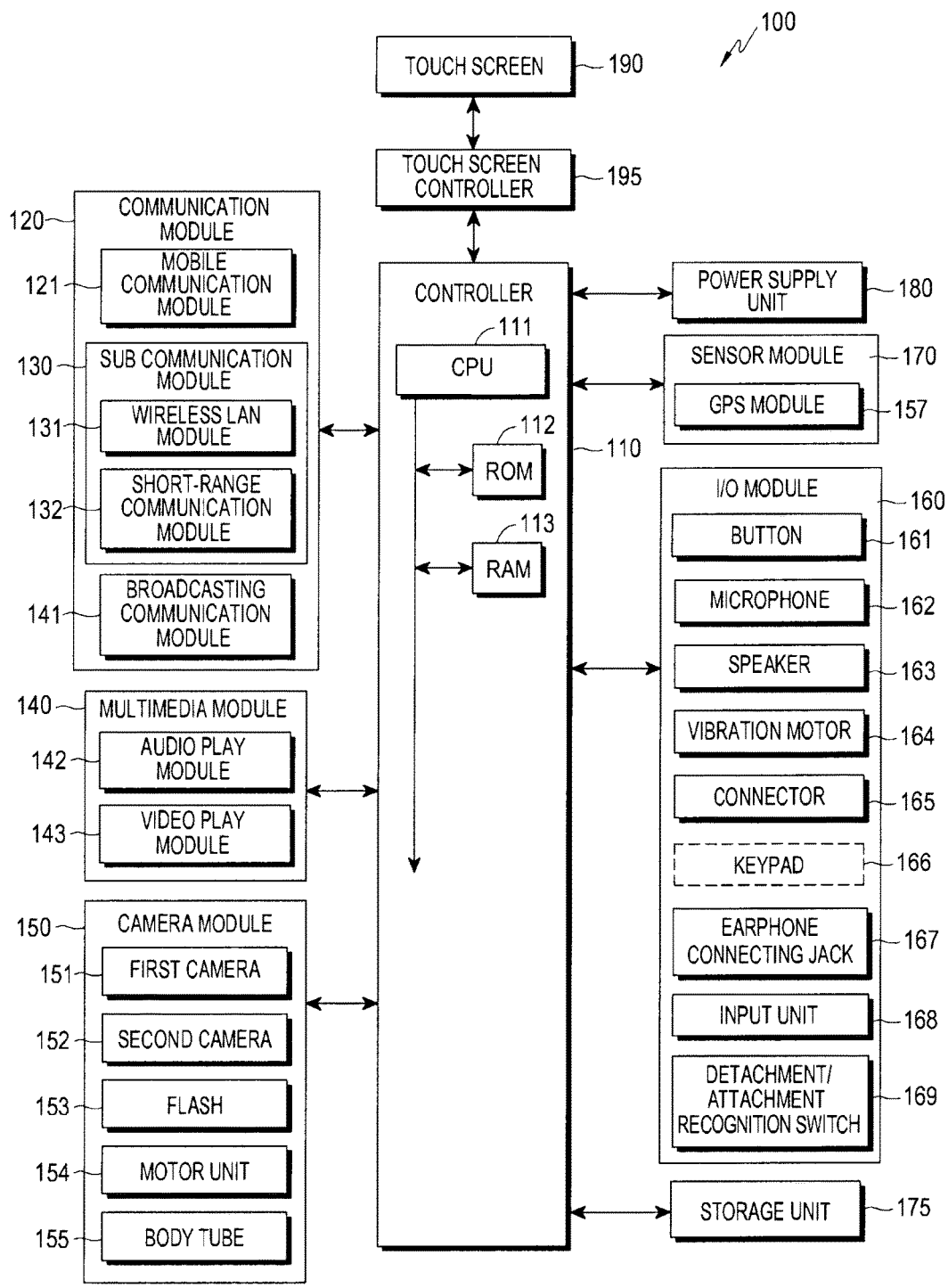
FIG. 1 is a block diagram of an electronic device according to an embodiment of the present disclosure.

Hereinafter, various embodiments of the present disclosure will be described in detail with reference to the accompanying drawings. The embodiments will be described for a person skilled in the art to sufficiently embody the present disclosure. Various embodiments of the present disclosure are different from each other, but it should be understood that it is not necessary to be mutually exclusive. For example, specific shapes, structures, and characteristics described herein may be embodied as the other embodiment without deviating from the sprit and scope of the present disclosure. It should be understood that the positions and disposition of individual constituent elements in the disclosed embodiments may be changed without deviating from the sprit and scope of the present disclosure. Accordingly, the detailed description to be described later is not understood as limitative meaning, and the scope of the present disclosure is limited only by accompanying claims with the entire scope equivalent to what is claimed by claims, as long as the scope is appropriately described. In the drawings, similar reference numerals and signs are the same over various aspects or indicate similar functions.

Although ordinal numbers, such as "first", "second", and so forth, will be used to describe various components, those components are not limited by the terms. The terms are used only for distinguishing one component from another component. For example, a first component may be referred to as a second component and similarly, a second component may also be referred to as a first component, without departing from the teaching of the inventive concept. The term "and/or" used herein includes any and all combinations of one or more of the associated listed items.

The terminology used herein is for the purpose of describing embodiments only and is not intended to be limiting of the embodiments. As used herein, the singular forms are intended to include the plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology. As long as the terms are not defined obviously, they are not ideally or excessively analyzed as formal meanings.

Embodiments of the present disclosure disclose an apparatus and method for recognizing an object included in a specific image displayed on a screen among a plurality of images stored in an electronic device, and displaying one or more images relating to the recognized object on a screen.

According to an embodiment of the present disclosure, the object included in the specific image may be selected by a user through input means. As a method of selecting and recognizing the object, for example, there is a method of enabling a user to select a specific area of an image displayed on a screen using input means, and performing image processing on the selected area to thereby select and recognize a specific object included in the selected area.

Also, according to an embodiment of the present disclosure, there is provided a method of performing image processing on the entire area of a displayed image to detect one or more objects included in the image, displaying the detected objects on a screen, and then enabling a user to select a specific object from among the detected objects.

If a specific object is selected from a displayed image, according to an embodiment of the present disclosure, filtering for displaying only images including the selected object or filtering for excluding images including the selected object to display the other images may be performed.

According to an embodiment of the present disclosure, "objects" that can be selected from the image may include any object that can be identified from the entire image, such as a human's face, a human body, a part of a human body, an object that a person possesses, an object that a person wears, an animal, a building, a part of a building, a tree, an object fixed on the background, a movable object, etc.

Also, the following description relates to an example of detecting at least one object included in an image, however, various embodiments of the present disclosure can be also applied to an example of detecting an object included in any one image among a plurality of images configuring a video file. Also, by determining, when searching for images including a selected object, whether images including the corresponding object exist in moving images, the embodiments of the present disclosure can be applied to moving images as well as still images.

The apparatus and method for displaying an image by recognizing an object displayed on a screen of an electronic device according to an embodiment of the present disclosure may be implemented by any electronic device including display means (for example, a touch screen). The electronic device according to an embodiment of the present disclosure may include any electronic device in which a predetermined application capable of displaying an image through the display means and controlling an image display method can be installed.

For example, the electronic device according to an embodiment of the present disclosure may be an arbitrary device including display means, and may be a digital camera, a smart phone, a mobile phone, a game, television (TV), a display apparatus, a vehicle-mounted head unit, a notebook computer, a laptop computer, a tablet computer, Personal Media Player (PMP), Personal Digital Assistants (PDA), a navigation system, a bank's Automated Teller Machine (ATM), a store's Point-Of-Sale (POS) system, or the like. Also, the electronic device according to an embodiment of the present disclosure may be a flexible device or a flexible display device.

A representative one of the electronic devices is a mobile device (for example, a mobile phone or a smart phone), and some of components included in the mobile device may be omitted or modified as necessary. First, a configuration of a mobile device, which is an example of an electronic device to which the present disclosure can be applied, will be described with reference to FIGS. 1 to 3, below.

FIG. 1 is a block diagram of an electronic device according to an embodiment of the present disclosure.

Referring to FIG. 1, an electronic device 100 may connect to an external electronic device (not shown) using at least one of a communication module 120, a connector 165, and an earphone connecting jack 167. The external electronic device may include an earphone, an external speaker, a Universal Serial Bus (USB) memory, a battery charger, a Cradle/Dock, a Digital Multimedia Broadcasting (DMB) antenna, a mobile payment system, healthcare equipment (a blood glucose meter, etc.), a game, a vehicle navigation system, and the like, which can be removably connected to the electronic device 100 through a line. Also, the electronic device 100 may include a Bluetooth communication apparatus, a Near Field Communication (NFC) apparatus, a WiFi Direct communication apparatus, a Wireless Access Point (WAP), and the like, which can be connected to the external electronic device in a wireless fashion. Also, the electronic device 100 may be connected to one of other electronic devices (for example, a mobile phone, a smart phone, a tablet PC, a desktop PC, and a server) in a wired/wireless fashion.

Referring to FIG. 1, the electronic device 100 may include at least one touch screen 190 and at least one touch screen controller 195. Also, the electronic device 100 may include a controller 110, a communication module 120, a multimedia module 140, a camera module 150, an input/output module 160, a sensor module 170, a storage unit 175, and a power supply unit 180. The communication module 120 may include a mobile communication module 121, a sub communication module 130, and a broadcasting communication module 141. The sub communication module 130 may include at least one of a Wireless LAN (WLAN) module 131 and a short-range communication module 132, and the multimedia module 140 may include at least one of an audio play module 142 and a video play module 143. The camera module 150 may include at least one of a first camera 151 and a second camera 152. Also, the input/output module 160 may include at least one among a button 161, a microphone 162, a speaker 163, a vibration device 164, the connector 165, and a keypad 166. The controller 110 may include a CPU 111, a Read Only Memory (ROM) 112 that stores control programs for controlling the electronic device 100, and a Random Access Memory (RAM) 113 that stores signals or data received from the outside or is used as a memory area for tasks being performed by the electronic device 100. The CPU 111 may include a single core, a dual core, a triple core, or a quad core. The CPU 111, ROM 112, and RAM 113 may be connected to each other through internal buses.

Also, the controller 110 may control the communication module 120, the multimedia module 140, the camera module 150, the input/output module 160, the sensor module 170, the storage unit 175, the power supply unit 180, the touch screen 190, and the touch screen controller 195.

The controller 110 may perform control operation of searching for one or more images including at least one object selected from an image displayed on the touch screen 190 to filter the found images so that a user can view the found images or to exclude the found images so that the user can view the other images. Details about the functions of the controller 110 according to embodiments of the present disclosure will be described with reference to FIG. 7, later.

According to an embodiment of the present disclosure, an input value may be input through a user input of touching the touch screen 190, a gesture input of inputting a gesture through the camera module 150, a switch/button input of pressing the buttons 161 or the keypad 166, and a voice input of inputting voice through the microphone 162.

Also, the controller 110 may sense a user input event such as a hovering event which is an indirect touch input of making an input unit 168 approach the touch screen 190 or of locating the input unit 168 close to the touch screen 190. If an object included in an image is selected by one of various kinds of input means, and one of various filtering function commands is input, according to an embodiment of the present disclosure, the controller 110 may control an image viewing function according to the function command.

Also, the controller 110 may detect various user inputs received through the touch screen 190, the camera module 150, the input/output module 160, and the sensor module 170. The user inputs may include various kinds of information that is input to the electronic device 100, such as a user's gesture, voice, movement of pupil, iris recognition, bio signals, and the like. The controller 110 may control the electronic device 100 to perform a predetermined operation or function corresponding to the detected user input.

Also, the controller 110 may output a control signal to the input unit 168 or the vibration device 164. The control signal may include information about a vibration pattern, and the input unit 168 or the vibration device 164 may generate vibration according to the vibration pattern. The information about the vibration pattern may represent the vibration pattern itself or an identifier of the vibration pattern. Also, the control signal may include a request for generating vibration.

The electronic device 100 may include at least one of the mobile communication module 121, the WLAN module 131, and the short-range communication module 132 according to performance.

The mobile communication module 121 may enable the electronic device 100 to connect to an external device through mobile communication using at least one or a plurality of antennas (not shown), under the control of the controller 110. The mobile communication module 121 may transmit/receive radio signals for a voice call, a video call, a SMS message, or a MIMS message to/from a mobile phone (not shown), a smart phone (not shown), a tablet PC (not shown), or another electronic device (not shown) when the corresponding phone number is input to the electronic device 100.

The sub communication module 130 may include at least one of the WLAN module 131 and the short-range communication module 132 as described above. For example, the sub communication module 130 may include one of the WLAN module 131 and the short-range communication module 132, or both the WLAN module 131 and the short-range communication module 132.

The WLAN module 131 may be connected to the Internet at a place in which a WAP has been installed, under the control of the controller 110. The WLAN module 131 may support the IEEE802.11x standard. The short-range communication module 132 may perform short-range communication between the electronic device 100 and an external electronic device in a wireless fashion under the control of the controller 110. The short-range communication may include Bluetooth, Infrared Data Association (IrDA), WiFi-Direct communication, NFC, and the like.

The broadcasting communication module 141 may receive broadcasting signals (for example, TV broadcasting signals, radio broadcasting signals, or data broadcasting signals) and broadcasting additional information (for example, an Electric Program Guide (EPS) or an Electric Service Guide (ESG)) transmitted from a broadcast station through a broadcasting communication antenna (not shown), under the control of the controller 110.

The multimedia module 140 may include the audio play module 142 and the video play module 143 as described above. The audio play module 142 may reproduce a digital audio file (for example, a file with the extension ".mp3", ".wma", ".ogg" or ".wav") that is stored in the storage unit 175 or received, under the control of the controller 110. The video play module 143 may reproduce a digital video file (for example, a file with the extension ".mpeg", ".mpg", ".mp4", ".avi", ".mov", or ".mkv") that is stored or received, under the control of the controller 110.

The multimedia module 140 may be integrated into the controller 110. The camera module 150 may include at least one of the first and second cameras 151 and 152 for photographing still images or moving images under the control of the controller 110. Also, the camera module 150 may include at least one among the body tube 155 for zooming in/out to photograph a subject, the motor unit 154 for controlling the movement of the body tube 155 for zooming-in/out of the body tube 155, and the flash 153 for providing a secondary light source required for photographing the subject. The first camera 151 may be disposed in the front side of the electronic device 100, and the second camera 152 may be disposed in the rear side of the electronic device 100.

The input/output module 160 may include at least one among at least one button 161, at least one microphone 162, at least one speaker 163, at least one vibration device 164, the connector 165, the keypad 166, the earphone connecting jack 167, and the input unit 168. However, the input/output module 160 is not limited to the above-mentioned devices, and a cursor control, such as a mouse, a trackball, a joystick, or cursor direction keys, may be provided to control the movement of a cursor on the touch screen 190.

The button 161 may be formed on the front, side, or rear surface of the housing (or case) of the electronic device 100, and may include at least one among a power/lock button, a volume button, a menu button, a home button, a back button, and a search button. The microphone 162 may receive a voice or sound under the control of the controller 110 to generate an electrical signal. The speaker 163 may output sound corresponding to various signals or data (for example, radio data, broadcasting data, digital audio data, digital video data, etc.) to the outside of the electronic device 100, under the control of the controller 110. The speaker 163 may output sound (for example, button manipulation sound corresponding to a call, currency connection sound, the other party's voice, etc.) corresponding to a function that is performed by the electronic device 100. There may be provided one or more speakers 163 at one or more appropriate locations on the housing of the electronic device 100.

The vibration device 164 may convert an electrical signal into mechanical vibration under the control of the controller 110. For example, if a voice or video call is made by another device (not shown) when the electronic device 100 is in a vibration mode, the vibration device 164 may operate. There may be provided one or more vibration devices 164 in the housing of the electronic device 100. The vibration device 164 may operate in correspondence to a user input through the touch screen 190.

The connector 165 may be used as an interface for connecting the electronic device 100 to an external electronic device or a power source (not shown). The controller 110 may transmit data stored in the storage unit 175 of the electronic device 100 to an external electronic device or receive data from the external electronic device through a wired cable connected to the connector 165. The electronic device 100 may receive power from a power source or charge its battery using the power source through the wired cable connected to the connector 165.

The keypad 166 may receive a key input from a user to control the electronic device 100. The keypad 166 includes a physical keypad (not shown) formed on the electronic device 100 or a virtual keypad (not shown) displayed on the touch screen 190. The physical keypad formed on the electronic device 100 may be excluded according to the performance or structure of the electronic device 100. The earphone (not shown) may be inserted into the earphone connecting jack 167 to connect to the electronic device 100.

The input unit 168 may be inserted into and held in the electronic device 100, and when it is used, the input unit 168 may be drawn or separated from the electronic device 100. In an area of the electronic device 100 into which the input unit 168 is inserted, a detachment/attachment recognition switch 169 that operates in correspondence to attachment and detachment of the input unit 168 is provided. The detachment/attachment recognition switch 169 may output a signal corresponding to attachment/separation of the input unit 168 to the controller 110. The detachment/attachment recognition switch 169 may be configured to directly or indirectly contact the input unit 168 when the input unit 169 is attached in the electronic device 100. Accordingly, the detachment/attachment recognition switch 169 may generate a signal (that is, a signal for notifying attachment or separation of the input unit 168) corresponding to attachment or separation of the input unit 168 based on whether the detachment/attachment recognition switch 169 contacts the input unit 168, and outputs the signal to the controller 110.

The sensor module 170 may include at least one sensor for detecting the state of the electronic device 100. For example, the sensor module 170 may include at least one sensor among a proximity sensor (not shown) for detecting an approach to the electronic device 100, an ambient light sensor (not shown) for detecting the ambient light intensity around the electronic device 100, a motion sensor (not shown) for detecting a motion (for example, rotation, acceleration, vibration) of the electronic device 100, a geomagnetic sensor (not shown) for detecting a point of the compass of the electronic device 100 using the earth's magnetic field, a gravity sensor (not shown) for detecting a direction in which gravity is applied, an altimeter (not shown) for measuring atmospheric pressure to detect an altitude, and a GPS module 157.

The GPS module 157 can receive radio waves from a plurality of GPS satellites (not shown) on the orbit around the earth, and calculate the location of the electronic device 100 based on a time of arrival of the radio waves from the GPS satellites to the electronic device 100.

The storage unit 175 may store signals or data that is input/output according to the operation of the communication module 120, the multimedia module 140, the camera module 150, the input/output module 160, the sensor module 170, or the touch screen 190, under the control of the controller 110. The storage unit 175 may store applications and control programs for controlling the electronic device 100 or the controller 110.

The term "storage unit" indicates an arbitrary data storage device, such as the storage unit 175, the ROM 112 and RAM 113 in the controller 110, a memory card (for example, a SD card or a memory stick) installed in the mobile terminal 1100, and the like. The storage unit 175 may include a non-volatile memory, a volatile memory, a hard disk drive (HDD), and a solid state drive (SSD).

Also, the storage unit 175 may store applications with various functions, such as navigation, a video call, a game, a time-based alarm application, etc., images for providing a user with Graphic User Interfaces (GUIs) associated with the applications, user information, document, databases or data related to a method of processing touch inputs, background images (a menu screen, a lock screen, etc.) or operation programs required to drive the electronic device 100, images photographed by the camera module 150, etc.

Also, the storage unit 175 may store a viewer application for viewing an image, according to an embodiment of the present disclosure, and store one or more images in various formats.

Figure 6:
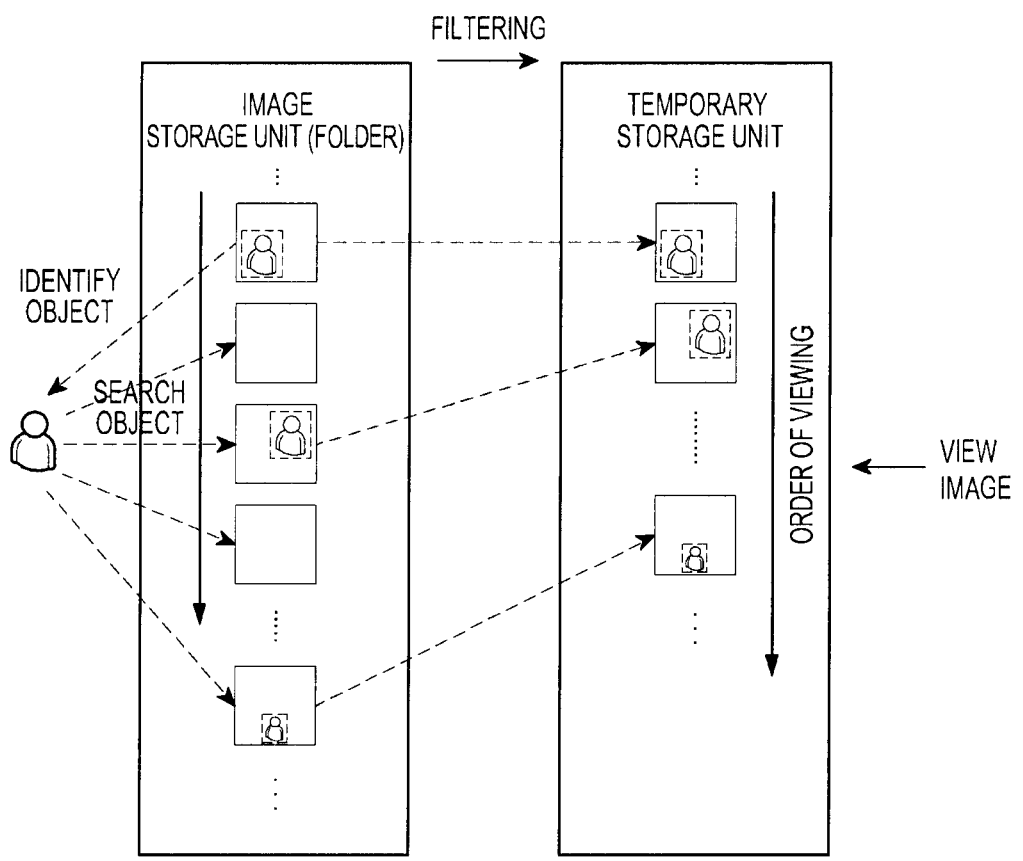
FIG. 6 is a view for describing a concept of displaying an image by recognizing an object displayed on a screen of an electronic device according to an embodiment of the present disclosure.

According to an embodiment of the present disclosure, a plurality of images stored in the storage unit 175 may be divided in units of predetermined groups, folders, categories, etc. As shown in FIG. 6, according to an embodiment of the present disclosure, an image including a selected object or identification information of the corresponding image may be stored in a separate storage area (for example, a temporary storage unit).

The storage unit 175 is machine (for example, a computer)-readable media, and the term "machine-readable media" can be defined as media of providing data to a machine so that the machine can perform a specific function. The storage unit 175 may include non-volatile media and volatile media. The media should be a tangible device so that commands transferred by the media can be detected by a physical device for reading the commands through a machine.

The machine-readable media may include at least one among a floppy disk, a flexible disk, a hard disk, a magnetic tape, a compact disc read-only memory (CD-ROM), an optical disk, a punch card, a paper tape, a RAM, a Programmable Read-Only Memory (PROM), an Erasable PROM (EPROM), and a FLASH-EPROM, however, the machine-readable media is not limited to the above-mentioned devices.

The power supply unit 180 may supply power to one or more batteries installed in the housing of the electronic device 100 under the control of the controller 110. The one or more batteries may supply power to the electronic device 100. Also, the power supply unit 180 may supply power received from an external power source to the electronic device 100 through a wired cable connected to the connector 165. Also, the power supply unit 180 may supply power received wirelessly from an external power source to the electronic device 100 through wireless charging technology.

Also, the electronic device 100 may include at least one touch screen 190 that provides a user with GUIs corresponding to various services (for example, a call, data transmission, and photographing). The touch screen 190 may output an analog signal corresponding to at least one user input inputted to a GUI to the touch screen controller 195.

The touch screen 190 may receive at least one user input through a user's body part (for example, a finger including a thumb) or the input unit 168 (for example, a stylus pen or an electronic pen). The touch screen 190 may be a resistive touch screen, a capacitive touch screen, an infrared touch screen, an acoustic wave touch screen, or their combination.

Also, the touch screen 190 may include at least two touch panels capable of respectively sensing touch/approach inputs by a finger and the input unit 168 in order to respectively receive inputs by the finger and the input unit 168. The at least two touch panels may provide different output values to the touch screen controller 195. The touch screen controller 195 may recognize values sensed through the at least two touch screen panels through as different values to determine whether an input through the touch screen 190 is an input by a finger or an input by the input unit 168.

In this specification, the "touch" is not limited to a contact of a user's body or touchable input means to the touch screen 190, and may include non-contact recognition (for example, when a user's body or the touchable input means is located within a recognition distance (for example, 1 mm) from the touch screen 190). The recognition distance in which the touch screen 190 can recognize the user input may depend on the performance or structure of the electronic device 100.

Then, the touch screen controller 195 may convert an analog signal received from the touch screen 190 into a digital signal, and transfers the digital signal to the controller 110. The controller 110 may control the touch screen 190 using the digital signal received from the touch screen controller 195. The touch screen controller 195 may detect a value (for example, a current value) output through the touch screen 190 to determine an hovering interval or distance as well as a user's input location, convert the determined distance value into a digital signal (for example, a z coordinate), and then provide the digital signal to the controller 110. Also, the touch screen controller 195 may detect a value (for example, a current value) output through the touch screen 190 to estimate pressure with which a user input device presses the touch screen 190, convert the estimated pressure value into a digital signal, and then provide the digital signal to the controller 110.

Figure 2:
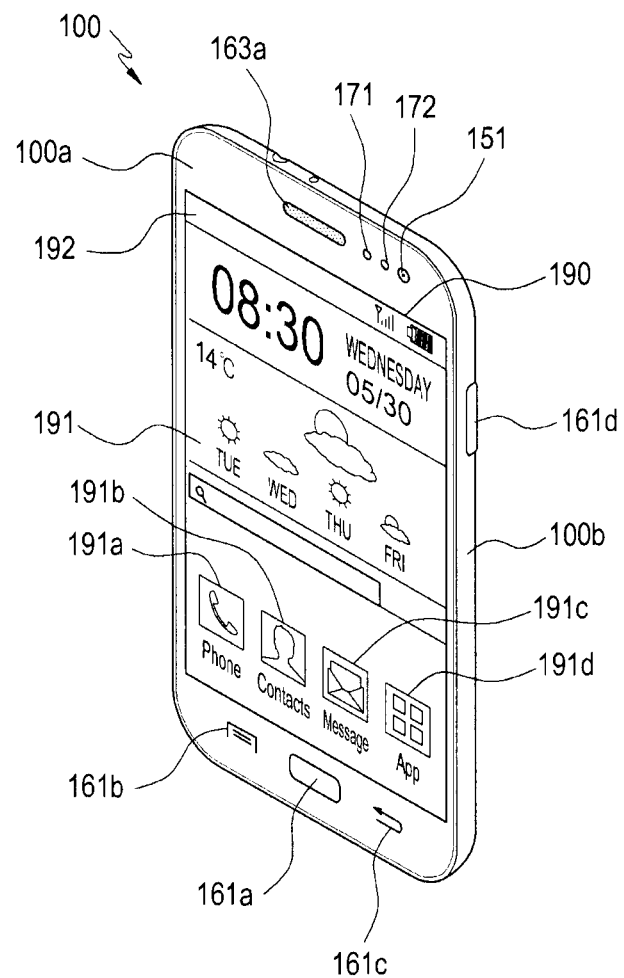
FIG. 2 is a front perspective view of an electronic device according to an embodiment of the present disclosure.
Figure 3:
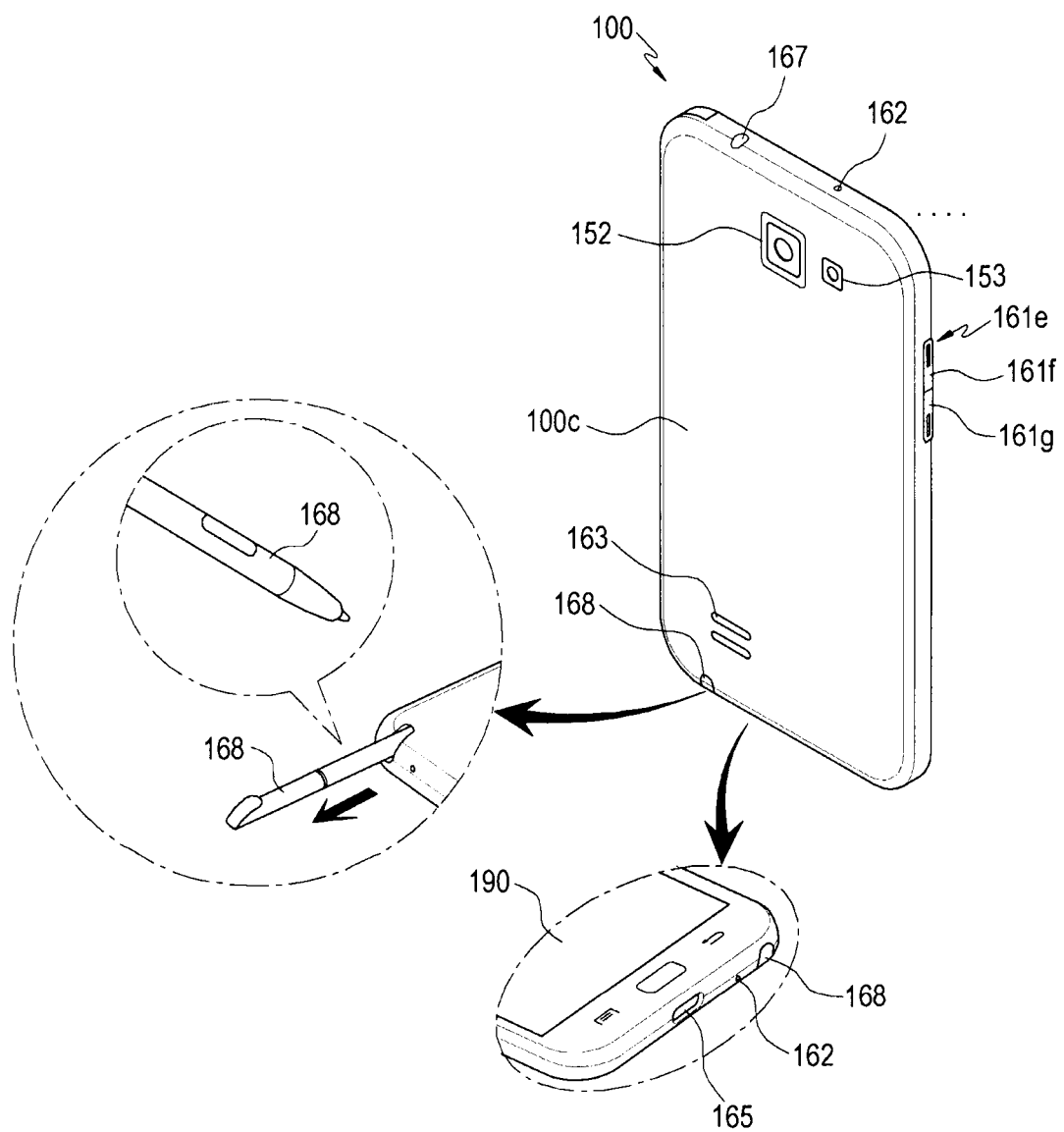
FIG. 3 is a rear perspective view of an electronic device according to an embodiment of the present disclosure.
Figure 4:
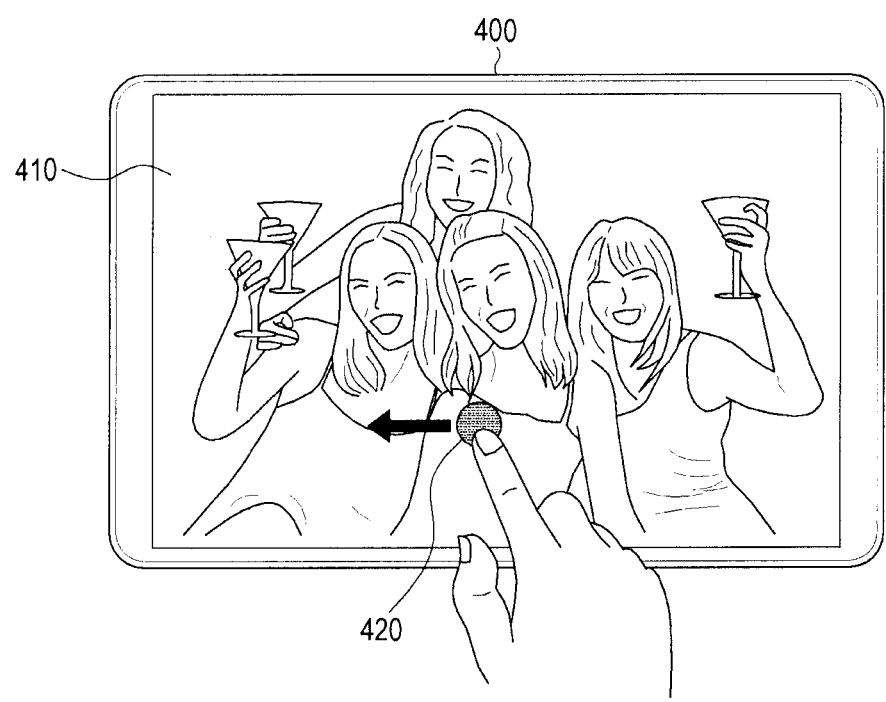
FIGS. 4 and 5 are views for describing a general method of viewing images in an electronic device.
Figure 5:
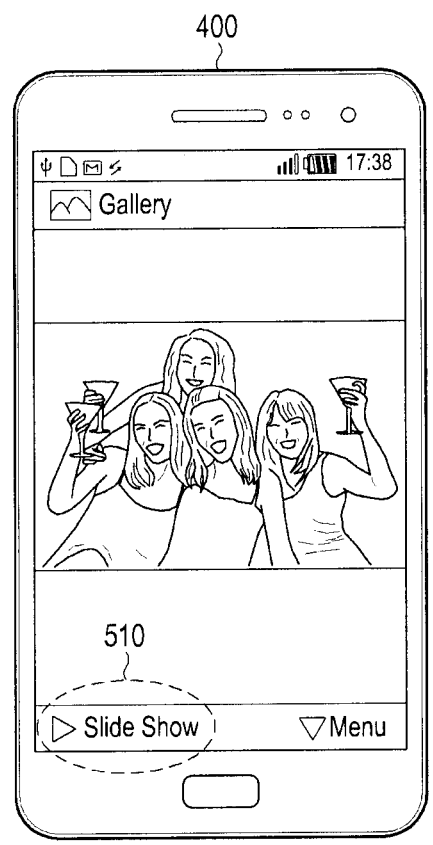

FIG. 2 is a front perspective view of an electronic device according to an embodiment of the present disclosure, and FIG. 3 is a rear perspective view of an electronic device according to an embodiment of the present disclosure.

Referring to FIGS. 1, 2, and 3, the touch screen 190 may be placed in the center of the front side 101 of the electronic device 100. The touch screen 190 may be formed with a large area occupying the main part of the front side 101 of the electronic device 100. FIG. 2 shows an example in which a main home screen is displayed on the touch screen 190. The main home screen is a screen initially appearing on the touch screen 190 when the electronic device 100 is powered on. If the electronic device 100 has different home screens of several pages, the main home screen may be the first home screen among the home screens of the pages. The home screen may display shortcut icons 191-*a*, 191-*b*, and 191-*c* for executing frequently used applications, a main menu conversion key 191-*d*, a current time, weather information, etc. If a user selects the main menu conversion key 191-*d*, a menu screen may be displayed on the touch screen 190. Also, a status bar 192 representing the status of the electronic device 100, such as a battery charged state, reception signal intensity, a current time, etc., may be displayed on the upper part of the touch screen 190.

Also, a home button 161*a*, a menu button 161*b*, and a back button 161*c* may be displayed on the lower part of the touch screen 190.

The home button 161a may be used to display a main home screen on the touch screen 190. For example, if the home button 161a is selected when another home screen than the main home screen or a menu screen is displayed on the touch screen 190, a main home screen may be displayed on the touch screen 190. Also, if the home button 161a is selected while applications are executed on the touch screen 190, the main home screen as shown in FIG. 2 may be displayed on the touch screen 190. Also, the home button 161a may be used to display recently used applications on the touch screen 190 or to display a task manager on the touch screen 190.

The menu button 161b may provide a link menu that can be displayed on the touch screen 190. The link menu may include a widget adding menu, a lock screen changing menu, a search menu, an edit menu, a setting menu, etc. The back button 161c may be used to display a screen executed just before a screen being currently executed or to terminate a most recently used application.

The first camera 151, an ambient light sensor 171, and a proximity sensor 172 may be disposed in one edge part of the front side of the electronic device 100. The second camera 152, the flash 153, and the speaker 163 may be disposed in the back side 103 of the mobile electronic device 100.

On the lateral sides of the mobile terminal 102, for example, a power/lock button 161d, volume buttons 161e including a volume-up button 161f and a volume-down button 161g, a terrestrial DMB antenna for receiving broadcasts, one or more microphones 162, etc. may be disposed. The DMB antenna may be fixed or removably attached on the electronic device 100.

Also, the connector 165 may be formed in the lateral side of the lower end of the mobile terminal 10. The connector 165 may include a plurality of electrodes, and can be connected to an external device through a line. The earphone connecting jack 167 may be formed in the lateral side of the upper end of the electronic device 100. An earphone may be inserted into the earphone connecting jack 167.

Also, the input unit 168 may be installed in the lateral side of the lower end of the electronic device 100. The input unit 168 may be inserted into the inside of the electronic device 100 and stored in the electronic device 100, and when it is used, the input unit 168 may be drawn and separated from the electronic device 100.

The detailed configuration of the electronic device 100 which is an example of an electronic device to which the present disclosure can be applied has been described above.

Hereinafter, an apparatus and method for displaying an image by recognizing an object displayed on a screen of an electronic device according to an embodiment of the present disclosure will be described in detail with reference to FIGS. 6 to 10.

FIG. 6 is a view for describing a concept of displaying an image by recognizing an object displayed on a screen of an electronic device according to an embodiment of the present disclosure. Referring to FIG. 6, a plurality of pictures or images stored in an image storage unit may be sequentially displayed on a screen in a predetermined order (for example, in the order of dates on which the pictures or images were photographed, in order of names of the pictures or images, or in the order of dates on which the pictures or images were stored). The images may be images stored in a storage unit of the electronic device. According to an embodiment, the images may be images stored in a server or located on a network, or images stored in another electronic device. More specifically, according to an embodiment of the present disclosure, images stored in the electronic device may be shown on the screen, or according to another embodiment of the present disclosure, images stored in another electronic device may be selectively shown on the screen. According to another embodiment, a specific image may be selected from among images stored in a cloud server, and the selected image may be received through the network to be shown on the screen.

If a specific object is selected from a specific image displayed on a screen according to an embodiment of the present disclosure, the object may be identified, and one or more images including the identified object may be searched in all images stored in the corresponding folder (or category) or in all stored images.

The found images including the object may be stored in a separate temporary storage unit. Accordingly, when a user wants to selectively view the images including the specific object, the user can view the images stored in the temporary storage unit. Also, according to another embodiment of the present disclosure, the remaining images not including the selected object may be stored in a separate temporary storage unit in order to enable a user to selectively view the images not including the specific object.

According to an embodiment, information stored in the temporary storage unit may be deleted when a filtering function according to an embodiment of the present disclosure is cancelled or released.

FIG. 6 is a view for describing the technical concept of a filtering method according to various embodiments of the present disclosure. However, other methods than the filtering method shown in FIG. 6 may be used to display images on the screen in the same way. According to an embodiment, one or more objects included in an image may have one or more identification information (for example, tag information). For example, one or more images including an identified object may be searched in all images stored in the corresponding storage folder (or category) or in all stored images, based on the identification information. Accordingly, when a user performs operation for viewing pictures or images, images including the object having the identification information or images not including the object having the identification information may be displayed.

In FIG. 6, an example of selecting images including an identified object and storing the selected images in a temporary storage unit is shown. At this time, the corresponding image files may be all stored in the temporary storage unit, or information (for example, address information on memory) about the image files may be stored in the temporary storage unit so that a user can view the selected images from the image storage unit by referring to the information about the image files stored in the temporary storage unit.

According to an embodiment, there may be various methods of determining whether an object selected from a specific image is included in the other images. For example, by comparing outlines and color information of images to each other to measure similarities between the images, it may be determined whether the images include the object.

Hereinafter, an apparatus and methods according to embodiments of the present disclosure will be described in detail with reference to FIGS. 7 to 10.

Figure 7:
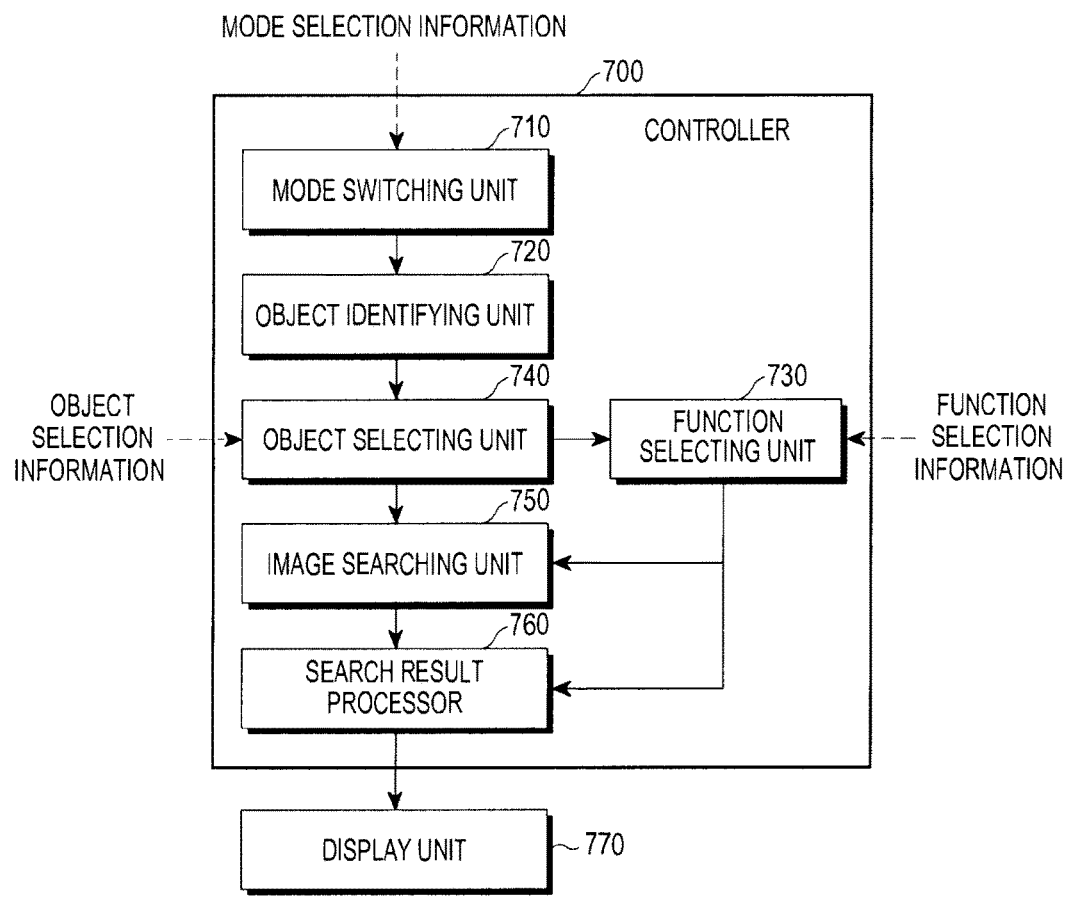
FIG. 7 is a block diagram illustrating a detailed configuration of an apparatus of displaying an image by recognizing an object displayed on a screen of an electronic device according to an embodiment of the present disclosure.

FIG. 7 is a block diagram illustrating an electronic device according to various embodiments of the present disclosure. Referring to FIG. 7, an electronic device 700 (for example, the electronic device 100) according to an embodiment of the present disclosure may include a mode switching unit 710, an object identifying unit 720, a function selecting unit 730, an object selecting unit 740, an image searching unit 750, and a search result processor 760. According to an example, the entire or a part of the components of the electronic device 700 may be included in the controller 110 of the electronic device 100 of FIG. 1.

The mode switching unit 710 may perform, if mode selection information is input when an image is displayed on a screen, a function of switching a current mode to a mode (for example, an object selection mode) for selecting an object. In the object selection mode, a user can select an object using one of various kinds of input means. Accordingly, a part of the image displayed on the screen may be selected as an area or a point, or a specific object may be selected from among one or more objects detected from the image.

Figure 11:
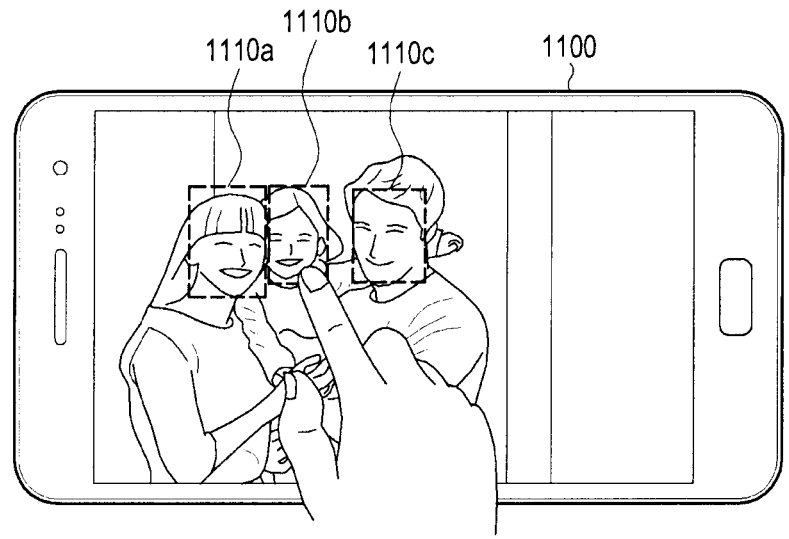
FIG. 11 shows an example in which embodiments of the present disclosure are implemented on screens of an electronic device.

The object identifying unit 720 may perform a function of identifying at least one object included in the image displayed on the current screen. For example, if a current mode is switched to the object selection mode by the mode conversion unit 710, at least one object included in the image displayed on the current screen may be identified. The object may be identified by image processing. For example, the object may be identified by a method of extracting outlines, a method of extracting features of an image, or a method of using contrast with respect to the background. If one or more objects are identified by the object identifying unit 720, areas of the corresponding identified objects may be displayed on the screen according to the results of the identification, as shown in FIG. 11. According to an embodiment, the objects may be identified by searching for images based on identification information (for example, tag information) of the objects.

The object selecting unit 740 may perform a function of selecting a specific object from among the objects identified by the object identifying unit 720 according to object selection information input by a user. When three objects are displayed on a screen, as shown in FIG. 11, a specific object may be selected from among the three objects by a user.

Figure 14:
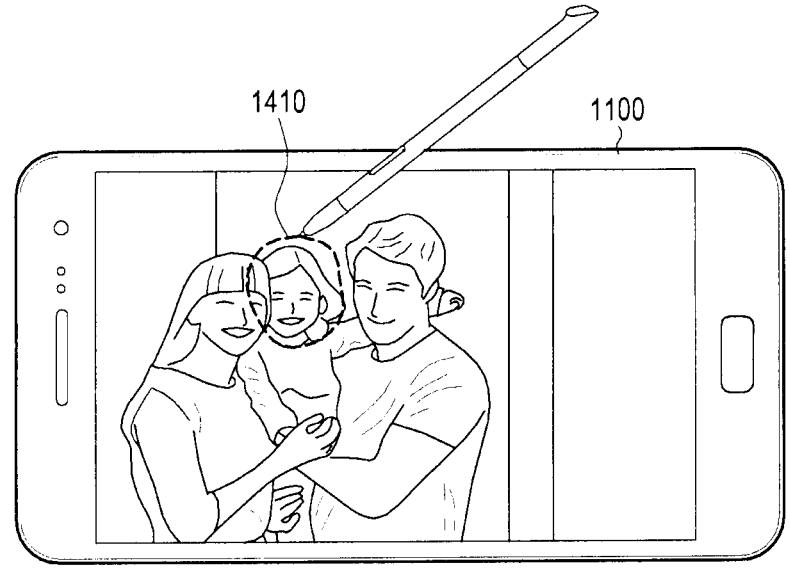
FIG. 14 shows an example in which embodiments of the present disclosure are implemented on screens of an electronic device.

According to an embodiment, it is possible to enable a user to select an area of an object in the object selection mode according to mode switching by the mode switching unit 710, as shown in FIG. 14. For example, after mode switching to the object selection mode occurs, a user may select a specific area of an image displayed on a screen using one of various kinds of input means (for example, a touch pen, a stylus pen, or a touch input using a finger). The object selecting unit 740 may select the selected area as an object.

The object selecting unit 740 may perform a function of selecting a specific object from an image displayed on a screen, based on object selection information input through input means. For example, as shown in FIG. 14, the object selecting unit 740 may select an area including at least one part of an image displayed on a screen to select the selected area as an object. As another example, as shown in FIG. 11, the object selecting unit 740 may identify one or more objects included in an image currently displayed on a screen, display the identified objects on the screen, and then cause a user to select a specific object from among the displayed objects.

Figure 12:
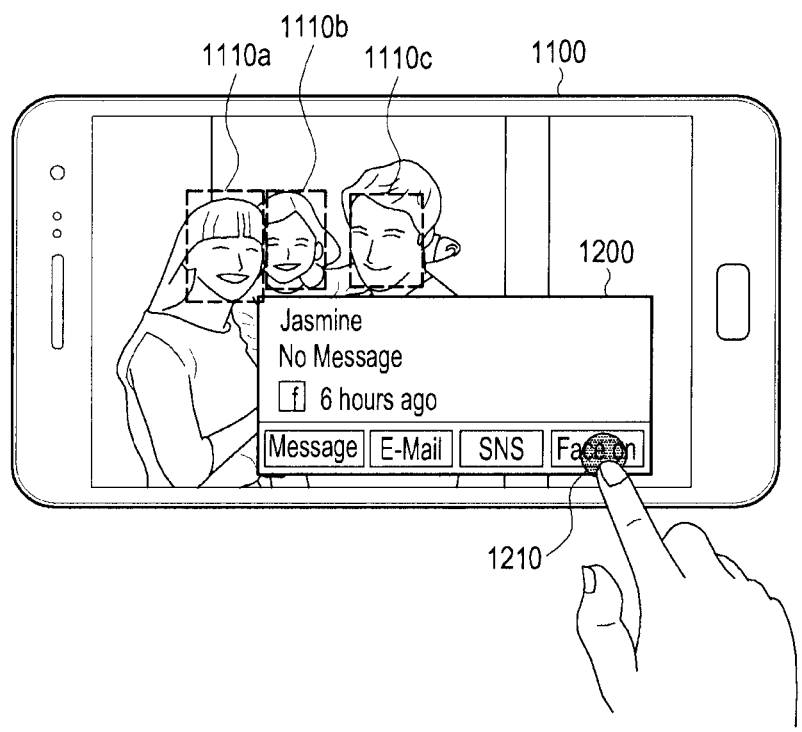
FIG. 12 shows an example in which embodiments of the present disclosure are implemented on screens of an electronic device.
Figure 15:
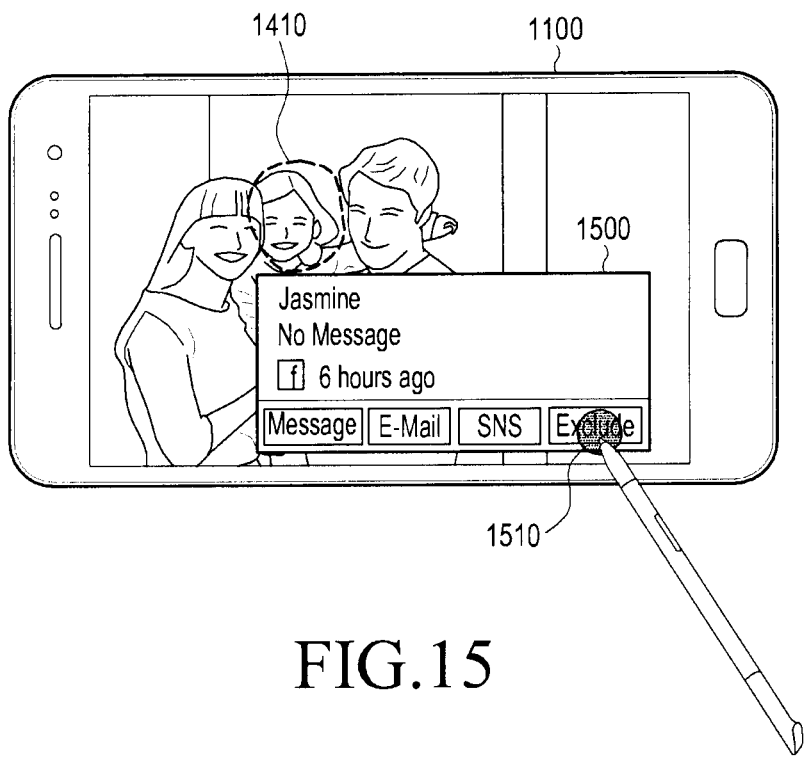
FIG. 15 shows an example in which embodiments of the present disclosure are implemented on screens of an electronic device.

The function selecting unit 730 may perform a function of selecting at least one function related to the selected object. For example, the function related to the selected object may include a function (hereinafter, referred to as a "Face on" function) of filtering images to display images including the selected object, and a function (hereinafter, referred to as a "Exclude" function) of filtering images in such a way to exclude images including the selected object to display images not including the selected object, according to an embodiment of the present disclosure. As shown in FIG. 12 or 15, a menu window for selecting the functions may be displayed in the screen so that the user can select a desired function from the menu window.

The image searching unit 750 may perform a function of searching for one or more images including an object selected by the object selecting unit 740 in images (for example, images stored in a specific folder (or category) selected by a user, or all images stored in the electronic device or a server) that are to be searched. According to an embodiment, by examining similarities between the selected object and the images that are to be searched, it may be determined whether the corresponding object is included in the images.

If the image searching unit 750 finds one or more images including the selected object, the search result processor 760 may display the images including the selected object on the display unit 770, according to the function selected by the function selecting unit 730. Also, for example, the search result processor 760 may display at least one image not including the selected object on the display unit 770. According to an embodiment, a predetermined function (for example, a function of displaying images including a selected object or a function of displaying images not including a selected object) may be automatically performed when an object is selected, without needing for the function selecting unit 730 to select a function.

The components of the electronic device 700, shown as separate units in FIG. 7, represent that they can be functionally and logically distinct parts. That is, this does not mean that they are physically separate components or implemented as separate codes.

In the present disclosure, each functional unit may signify a functional and structural combination of hardware for implementing the technological concept of the present disclosure and software for driving the hardware. For example, it is obvious to those skilled in the art to which the present disclosure pertains that the functional unit may signify a logical unit of a predetermined code and a hardware resource for implementing the predetermined code, and it does not necessarily mean physically connected codes or one kind of hardware.

Hereinafter, a procedure of displaying an image by recognizing an object displayed on a screen of an electronic device according to an embodiment of the present disclosure will be described with reference to FIGS. 8 to 10.

Figure 8A:
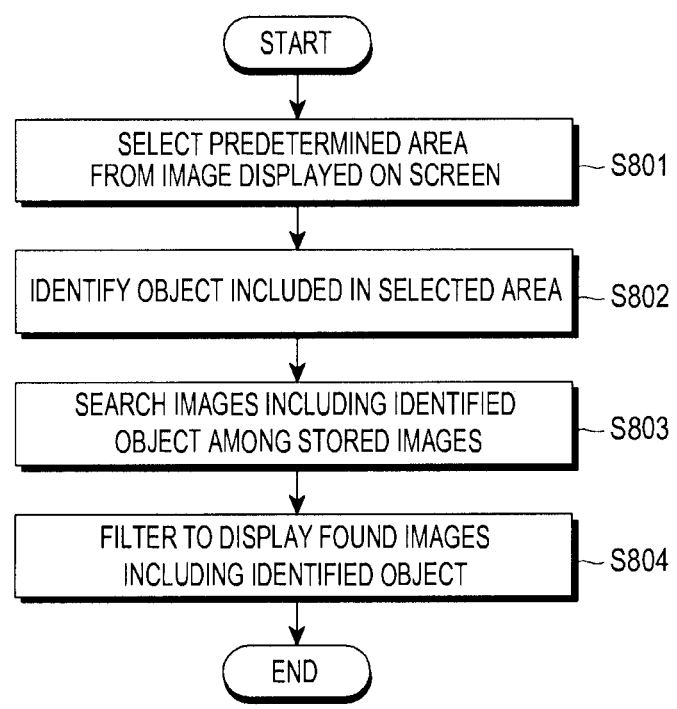
FIG. 8A is a flowchart illustrating a procedure of displaying an image by recognizing an object displayed on a screen of an electronic device according to an embodiment of the present disclosure.

FIG. 8A is a flowchart illustrating a procedure of displaying an image by recognizing an object displayed on a screen of an electronic device according to various embodiments of the present disclosure. Referring to FIG. 8A, a predetermined area (for example, an area including a distinguishable object) may be selected from an image (for example, a picture) displayed on a screen of an electronic device, in operation S801.

If the area is selected, an object included in the selected area may be identified, in operation S802. Then, one or more images including the identified object may be searched in images stored in the corresponding folder (or category) or in all or a part of images stored in the storage unit, in operation S803. Then, the found images including the identified object may be displayed on a screen, in operation S804.

Figure 8B:
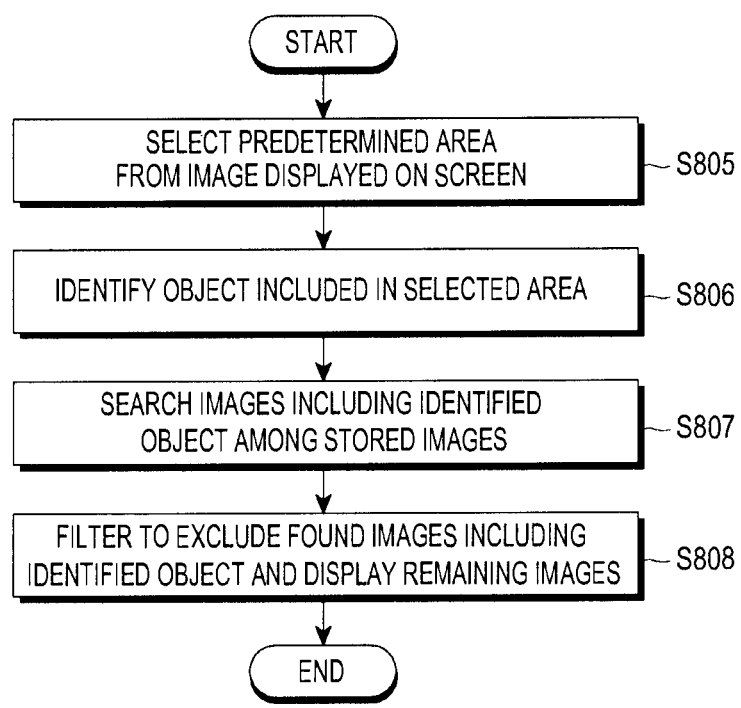
FIG. 8B is a flowchart illustrating a procedure of displaying an image by recognizing an object displayed on a screen of an electronic device according to another embodiment of the present disclosure.

FIG. 8B is a flowchart illustrating a procedure of displaying an image by recognizing an object displayed on a screen of an electronic device according to another embodiment of the present disclosure. Referring to FIG. 8B, a predetermined area (for example, an area including a distinguishable object) may be selected from an image (for example, a picture) displayed on a screen of an electronic device, in operation S805.

If the area is selected, an object included in the selected area may be identified, in operation S806. Then, one or more images including the identified object may be searched in images stored in the corresponding folder (or category) or in all or a part of images stored in the storage unit, in operation S807. Then, the found images including the identified object may be excluded, and the remaining images may be displayed on a screen.

Hereinafter, a method of viewing an image by selecting an object from a screen of an electronic device according to embodiments of the present disclosure will be described with reference to FIGS. 9 and 10.

Figure 9:
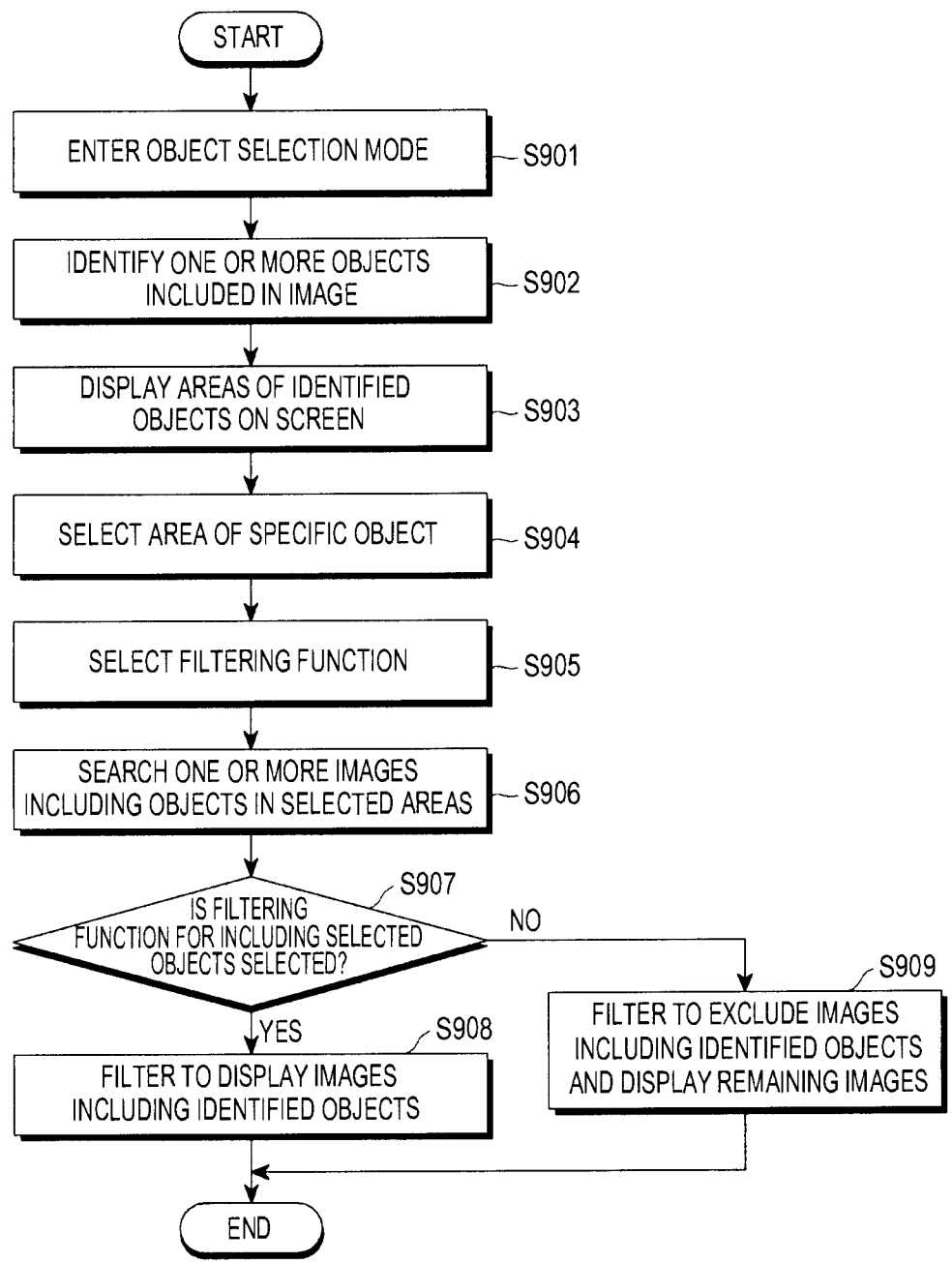
FIG. 9 is a flowchart illustrating a procedure of viewing an image by selecting an object from a screen of an electronic device according to an embodiment of the present disclosure.

FIG. 9 is a flowchart illustrating a procedure of viewing an image by selecting an object from a screen of an electronic device according to an embodiment of the present disclosure. For example, if an application for performing an image display function is executed, at least one image (for example, at least one picture) may be displayed through a screen. If a user viewing the image presses a predetermined button or selects a mode switching function provided through a menu, the electronic device may enter an object selection mode, in operation S901.

If the electronic device enters the object selection mode, the application may identify one or more objects included in the currently displayed image, in operation S902. Then, the application may display areas of the identified objects on a screen, as shown in FIG. 11, in operation S903. The user may select the area of a specific object from among the areas of the one or more objects displayed on the screen, in operation S904. Also, as shown in FIG. 12 or 15, the user may select a filtering function, in operation S905. According to another embodiment, the user may select an object from an image having no marks indicating objects.

If the filtering function is selected, one or more images including the objects in the selected areas may be searched in images stored in a folder (or category) in which the current image is located or in all or a part of images stored in a storage unit, in operation S906. The images may be images stored in a server or another electronic device.

For example, if the selected filtering function is a filtering function for including the selected objects ("Yes" in operation S907), images including the identified objects may be filtered and displayed as the results of the searching, in operation S908. The filtered images may be sequentially displayed on a screen according to the user's screen manipulation.

Meanwhile, if the selected filtering function is a filtering function for excluding the selected objects ("No" in operation S907), images including the identified objects may be excluded and the remaining images may be filtered and displayed as the results of the searching, in operation S909. The filtered images may be sequentially displayed on a screen according to the user's screen manipulation.

Figure 10:
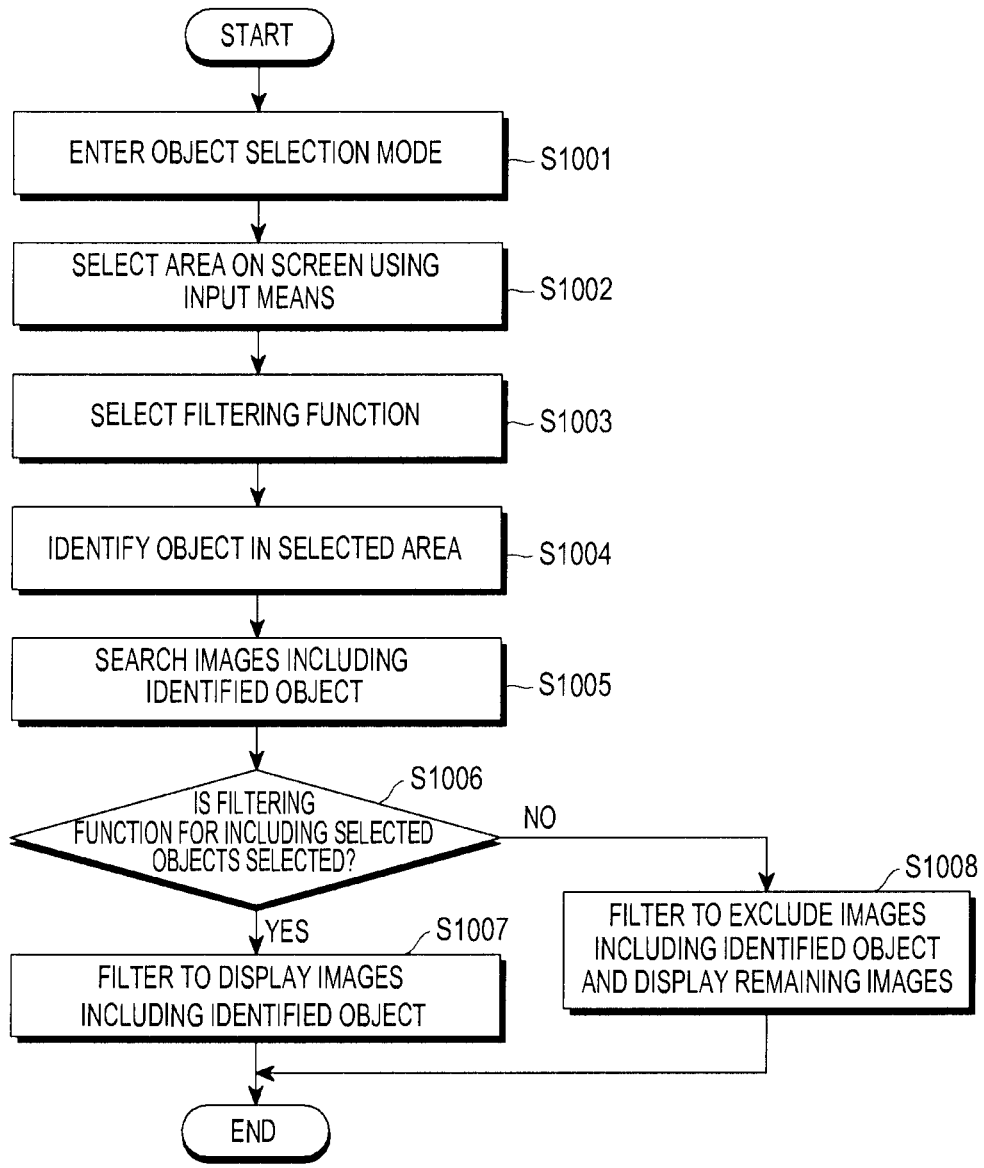
FIG. 10 is a flowchart illustrating a procedure of viewing an image by selecting an object from a screen of an electronic device according to another embodiment of the present disclosure.

FIG. 10 is a flowchart illustrating a procedure of viewing an image by selecting an object from a screen of an electronic device according to another embodiment of the present disclosure. For example, if an application for displaying images is executed, at least one image (for example, at least one picture) may be displayed through a screen. If a user viewing the image presses a predetermined button or selects a mode switching function provided through a menu, the electronic device may enter an object selection mode, in operation S1001.

If the electronic device enters the object selection mode, a user may select a specific area on a screen using input means, in operation S1002. At this time, the selected area may be in the shape of a closed loop, as shown in FIG. 14. As such, if the specific area is selected from the image displayed on the screen, the user may select a filtering function, as shown in FIG. 12 or 15, in operation S1003.

If the filtering function is selected, an object may be identified in the selected area, in operation S1004. Then, one or more images including the identified object may be searched in images stored in a folder (or, category) in which the current image is located or in all or a part of images stored in the storage unit, in operation S1005. The images may be images stored in a server or another electronic device.

If the selected filtering function is a filtering function for including the selected object ("Yes" in operation S1006), one or more images including the identified object may be filtered and displayed as the results of the searching, in operation S1007. The filtered images may be sequentially displayed on a screen according to a user's screen manipulation.

Meanwhile, if the selected filtering function is a filtering function for excluding the selected object ("No" in operation S1006), one or more images including the identified object may be excluded and the remaining images may be displayed as the results of the searching, in operation S1008. The filtered images may be sequentially displayed on a screen according to a user's screen manipulation.

The method of displaying an image by recognizing an object displayed on a screen of the electronic device and the method of viewing an image by selecting an object from a screen of the electronic device, according to the embodiments of the present invention, may be implemented as computer-executable programs executable by various computational devices and stored in computer-readable recording medium. The computer readable recording medium may include a program command, a data file, a data structure, or a combination thereof. The program command written to the computer readable recording medium may be specially designed and configured or may be already known to those skilled in the field of computer software. Examples of the computer readable recording medium include magnetic storage media (e.g., hard disks, floppy disks, and magnetic tapes), optical recording media (e.g., CD-ROMs and DVDs), magneto-optical storage media (e.g., floptical disks), and hardware devices (e.g., Read-Only Memories (ROMs), Random-Access Memories (RAMs), and flash memories) configured to store and execute program commands. Program commands may include, for example, a high-level language code that can be executed by a computer using an interpreter, as well as a machine language code made by a complier. The hardware devices may be configured to be operated by one or more software modules to implement the present disclosure, and vice versa.

Hereinafter, an example in which embodiments of the present disclosure are implemented on a screen of an electronic device will be described with reference to FIGS. 11 to 16.

Referring to FIG. 11, if an image is displayed on a screen of an electronic device, and the electronic device enters a mode (for example, an object selection mode) for selecting an object, one or more objects included in the image may be identified so that object areas can be displayed on the screen. FIG. 11 shows an example in which human faces are identified as objects by image processing, and object areas 1110*a*, 1110*b*, and 1110*c* are represented by dotted lines.

However, the object areas 1110a, 1110b, and 1110c may be represented in various manners, instead of dotted lines. For example, the object areas 1110a, 1110b, and 1110c may be displayed with solid lines of different colors or with lines drawn around the outlines (for example, contours) of the corresponding objects. Also, by performing image processing on the entire identified objects, the object areas 1110a, 1110b, and 1110c may have diverse effects.

If the object areas 1110a 1110b, and 1110c are displayed, the user may select an object from among the displayed objects through various input means (for example, a touch input by a finger). According to another embodiment, the user may select at least one object from an image having no marks indicating objects.

According to an embodiment, a plurality of objects may be selected. If the plurality of objects are selected, filtering for displaying one or more images including at least one object of the plurality of objects, or filtering for not displaying one or more images including at least one object of the plurality of objects may be performed.

If the objects are selected, a menu window 1200 for enabling a user to select various additional functions related to the selected objects may be displayed on a screen, as shown in FIG. 12. For example, a user can transmit a message or E-mail including the current image or the selected objects, or can upload the corresponding image on a Social Network Service (SNS) site.

Also, according to an embodiment of the present disclosure, if a filtering button (for example, a Face on button) 1210 for including objects is selected from the menu window 1200, one or more images including the selected objects as shown in FIG. 11 among images in the current folder (or category), all stored images, or images stored in a server or another electronic device may be successively displayed on the screen.

Figure 13:
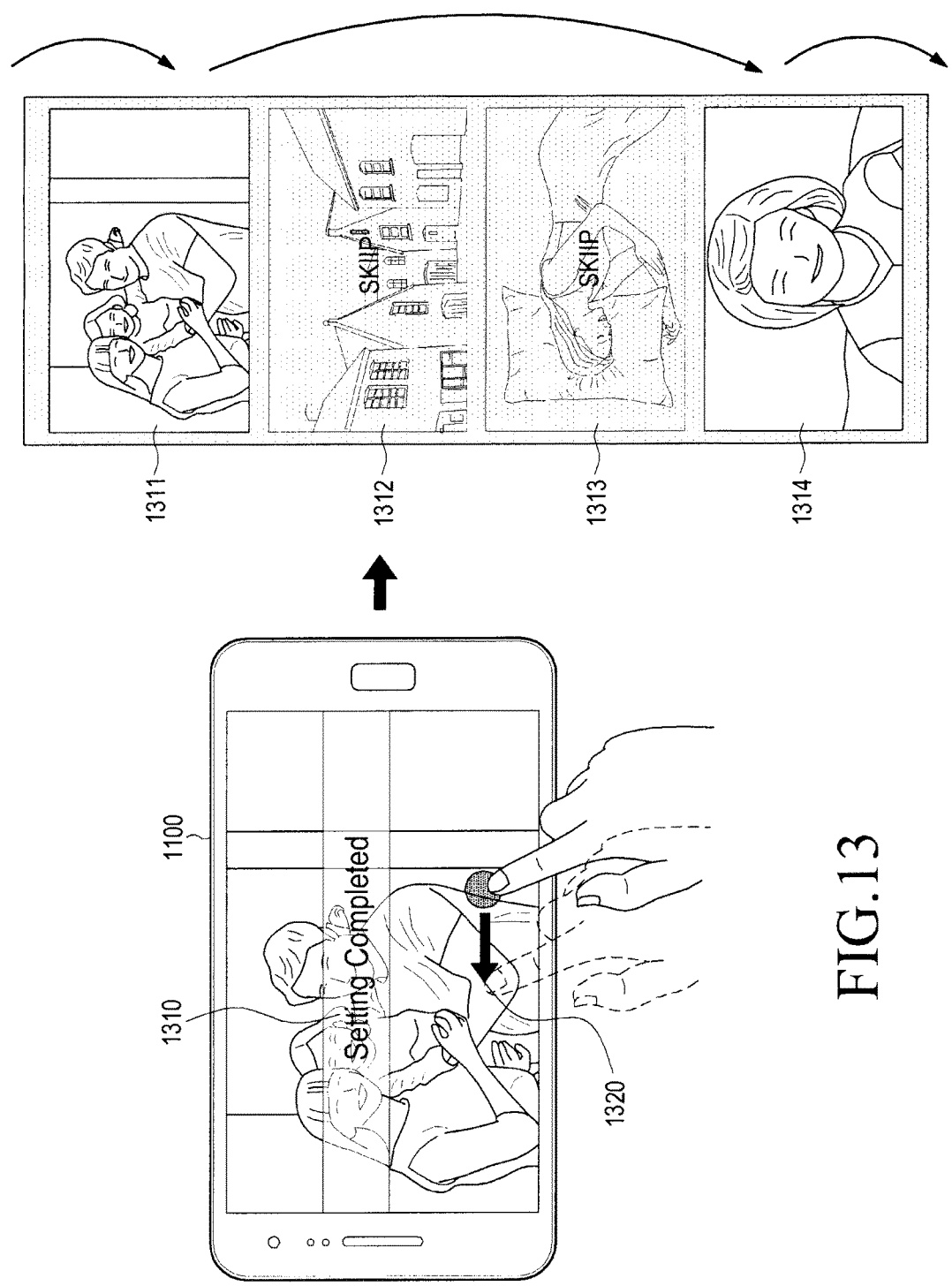
FIG. 13 shows an example in which embodiments of the present disclosure are implemented on screens of an electronic device.

For example, referring to FIG. 13, when a user selects the filtering button 1210 for including objects, as shown in FIG. 12, and slides/drags (1320) his/her finger on a currently displayed screen image 1310 to view the next image, the next image that is to be displayed following the screen image 1310 may be, if the next image does not include the selected objects, skipped so as to be not displayed, and other images including the selected objects may be displayed.

For example, when first to fourth images 1311 to 1314 are sequentially displayed before a function according to an embodiment of the present disclosure is executed, a filtering function for including objects, according to an embodiment of the present disclosure, may be executed. In this case, images not including the selected objects among the first to fourth images 1311 to 1314 may be excluded, and the remaining images may be displayed. For example, when an object selected from the first image 1311 is included in the fourth image 1314 but not included in the second and third images 1312 and 1313, a user may slide/drag his/her finger on the first image 1311 to view the next image. In this case, the second and third images 1312 and 1313 may be skipped, and the fourth image 1314 may be displayed on the screen.

Accordingly, by executing the function according to an embodiment of the present disclosure, the user can selectively view his/her desired images.

According to another embodiment, if the user selects a filtering button 1510 (for example, an "Exclude" button) for excluding objects from a menu window 1500, as shown in FIG. 15, images including the selected objects as shown in FIG. 11 among images in the current folder (or category) or all stored images may be skipped, and images not including the selected objects may be displayed.

Figure 16:
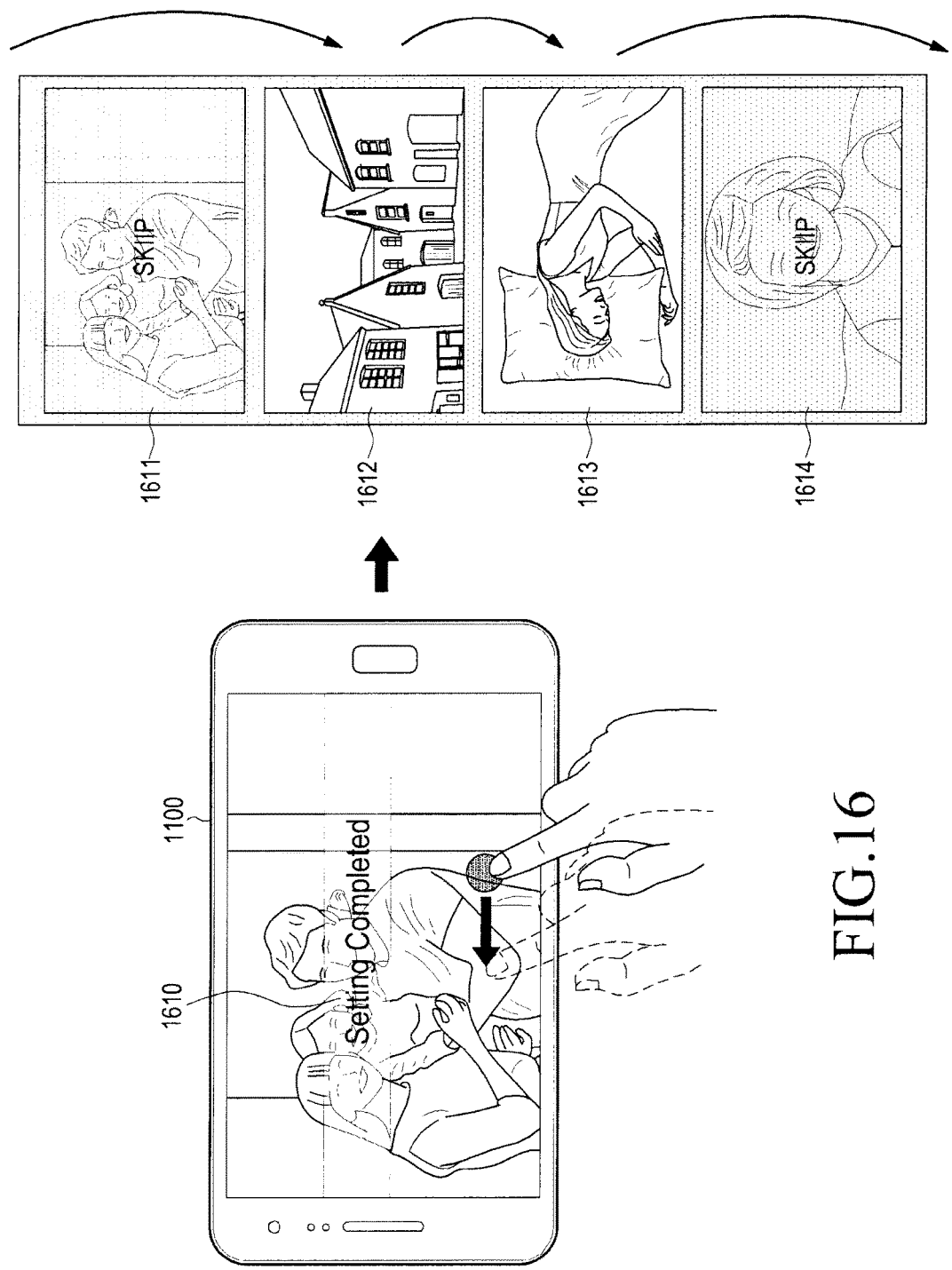
FIG. 16 shows an example in which embodiments of the present disclosure are implemented on screens of an electronic device.

Referring to FIG. 16, when the user selects the filtering button 1510 for excluding objects, as shown in FIG. 15, and slides/drags his/her finger on a currently displayed screen image 1610 to view the next image, the next image that is to be displayed following the screen image 1610 may be, if the next image includes the selected objects, skipped so as to be not displayed, and other images not including the selected objects may be displayed.

For example, when first to fourth images 1611 to 1614 are sequentially displayed before a function according to an embodiment of the present disclosure is executed, a filtering function for excluding objects, according to an embodiment of the present disclosure, may be executed. In this case, images including the selected objects among the first to fourth images 1611 to 1614 may be filtered out and excluded, and the remaining images may be displayed. For example, when an object selected from the first image 1611 is included in the fourth image 1614 but not included in the second and third images 1612 and 1613, a user may slide/drag his/her finger on the first image 1611 to view the next image. In this case, the second and third images 1612 and 1613 may be displayed, the fourth image 1614 may be skipped, and other images not including the object may be displayed on the screen.

In this way, by executing the function according to an embodiment of the present disclosure, the user can exclude his/her undesired images when viewing images.

Referring to FIG. 14, if an image is displayed on a screen of an electronic device, and the electronic device enters a mode (for example, an object selection mode) for selecting objects, a user can himself or herself mark an object area in the displayed image using input means to thus select an object. For example, referring to FIG. 14, an area selected by an electronic pen in the object selection mode may be represented as a selected object area 1410 by dotted lines. At this time, the selected object area 1410 may be represented in various manners, instead of dotted lines. For example, the selected object area 1410 may be displayed with solid lines of different colors or with lines drawn around the outlines (for example, contours) of the corresponding object. Also, by performing image processing on the identified object, the object area 1410 may have diverse effects. Also, the object area 1410 may be in the shape of a closed loop, and at least one object included in the inside of the closed loop may be considered as a selected object.

According to an example, if a plurality of objects are included in the selected object area 1410, filtering for displaying images including at least one object of the plurality of objects, or filtering for not displaying images including at least one object of the plurality of objects may be performed.

If an object is selected as shown in FIG. 14, a menu window 1200 or 1500 for enabling a user to select various additional functions related to the selected object may be displayed on a screen, as shown in FIG. 12 or 15. For example, a user can transmit a message or E-mail including the current image or the selected object, or can upload the corresponding image on a SNS site, as shown in FIG. 12.

Also, according to an embodiment of the present disclosure, if a filtering button (for example, a Face on button) 1210 for including objects is selected from the menu window 1200, one or more images including the selected object as shown in FIG. 14 among images in the current folder (or category) or all stored images may be successively displayed on the screen.

Referring to FIG. 13, if the filtering button 1210 for including objects is selected as shown in FIG. 12, a user may slide/drag (1320) his/her finger on a currently displayed screen image 1310 to view the next image. In this case, the next image that is to be displayed following the screen image 1310 may be, if the next image does not include the selected object, skipped so as to be not displayed, and other images including the selected object may be displayed.

For example, when first to fourth images 1311 to 1314 are sequentially displayed before a function according to an embodiment of the present disclosure is executed, a filtering function for including objects, according to an embodiment of the present disclosure, may be executed. In this case, images not including the selected object among the first to fourth images 1311 to 1314 may be excluded, and the remaining images may be displayed. For example, when an object selected from the first image 1311 is included in the fourth image 1314 but not included in the second and third images 1312 and 1313, a user may slide/drag his/her finger on the first image 1311 to view the next image. In this case, the second and third images 1312 and 1313 may be skipped, and the fourth image 1314 may be displayed on the screen, as shown in FIG. 13.

Accordingly, by executing the function according to an embodiment of the present disclosure, the user can selectively view his/her desired images.

According to an embodiment, if a user selects a filtering button 1510 (for example, an "Exclude" button) for excluding objects from a menu window 1500, as shown in FIG. 15, images including the selected object as shown in FIG. 14 among images in the current folder (or category) or all stored images may be skipped, and images not including the selected object may be displayed.

Referring to FIG. 16, when a user selects a filtering button 1510 for including objects, as shown in FIG. 15, and slides/drags his/her finger on a currently displayed screen image 1610 to view the next image, the next image that is to be displayed following the screen image 1610 may be, if the next image includes the selected object, skipped so as to be not displayed, and other images not including the selected object may be displayed.

For example, when first to fourth images 1611 to 1614 are sequentially displayed before a function according to an embodiment of the present disclosure is executed, a filtering function for excluding objects, according to an embodiment of the present disclosure, may be executed. In this case, images including the selected object among the first to fourth images 1611 to 1614 may be filtered out and excluded, and the remaining images may be displayed. For example, when an object selected from the first image 1611 is included in the fourth image 1314 but not included in the second and third images 1612 and 1613, a user may slide/drag his/her finger on the first image 1611 to view the next image. In this case, the second and third images 1612 and 1613 may be displayed, the fourth image 1414 may be skipped, and other images not including the corresponding object may be displayed on the screen, as shown in FIG. 16.

In this way, by executing the function according to an embodiment of the present disclosure, the user can exclude his/her undesired images when viewing images.

Figure 17:
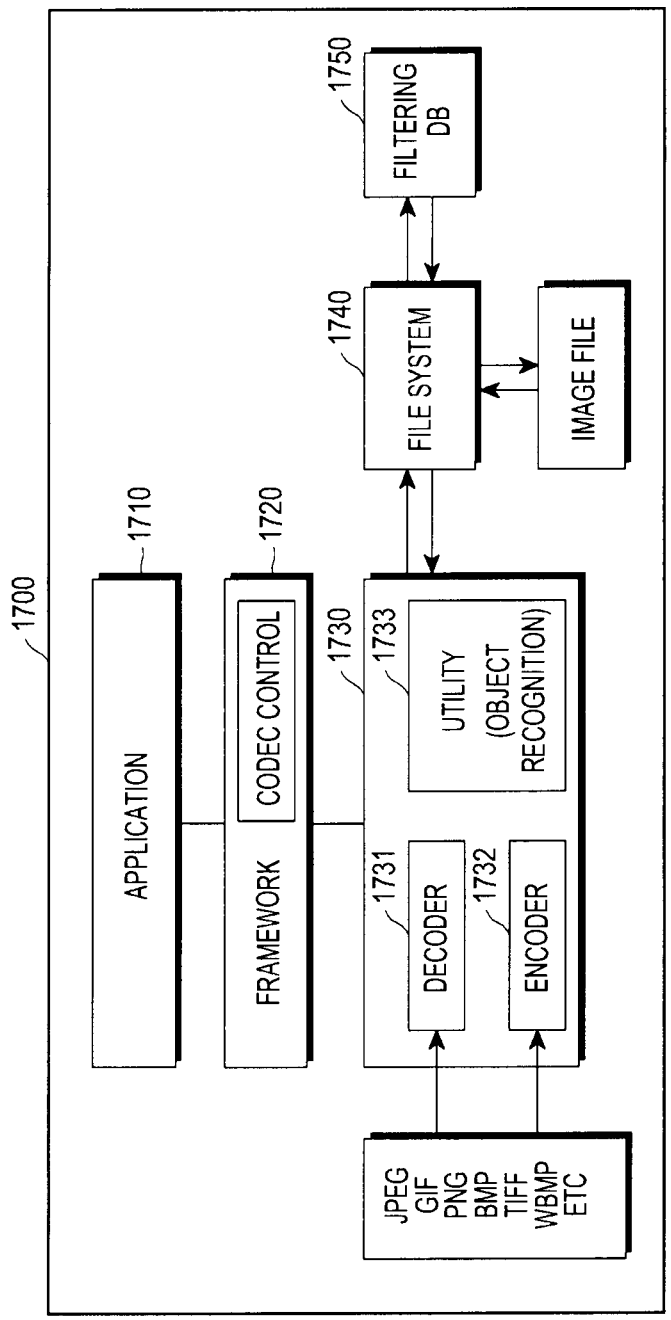
FIG. 17 is a block diagram illustrating a detailed configuration of a device implemented according to an embodiment of the present disclosure.

FIG. 17 is a block diagram illustrating a detailed configuration of an electronic device (for example, the electronic device 100) implemented according to an embodiment of the present disclosure. Referring to FIG. 17, an application 1710 for performing functions according to an embodiment of the present disclosure may be installed in an electronic device 1700. The application 1710 may basically include a function of an image viewer, or may be included in or implemented in connection to a pre-installed image viewer application.

The electronic device 1700 may include a controller 1730 to perform the functions according to an embodiment of the present disclosure. The controller 1730 may include a decoder 1731, an encoder 1732, and utility 1733 for recognizing objects. Also, according to an embodiment of the present disclosure, a framework 1720 may be configured between the application 1710 and the controller 1730. The framework 1720 may include a codec control function.

A file system 1740 may perform a function of inputting/outputting a file (for example, an image file) stored in a storage unit, and a function of storing files filtered according to an embodiment of the present disclosure in filtering database (DB) 1750.

If the application 1710 is executed so that an image file stored in the storage unit is loaded by the file system 1740, the decoder 1731 may decode the image file according to the format (for example, JPEG, GIF, PNG, BMP, TIFF, WBMP, etc.) of the image file to display an image through a display unit. Also, each image may be encoded according to the format of the corresponding image file by the encoder 1732, and then stored in the storage unit. If a specific object included in an image is selected, and a filtering function related to the selected object is executed, as described above according to an embodiment of the present disclosure, the utility 1733 may compare the selected object to image files stored in the storage units to determine whether the corresponding object is included in any one(s) of the image files.

The configuration of FIG. 17 is shown as an example for implementing the embodiments of the present disclosure, and the present disclosure is not limited to the configuration of FIG. 17.

Also, an image from which an object is recognized according to another embodiment of the present disclosure may be stored in separate database and managed, which is not described in the present disclosure. More specifically, by extracting each object (for example, a face) included in images stored in the storage unit, and causing a user to input additional information about the extracted object, images can be managed for each object.

For example, it is possible to extract one or more faces included in each image, to cause a user to input related information (for example, names, family relations, descriptions, etc.) about the extracted faces, to map the related information to the corresponding faces, and then to store the results of the mapping in database.

Information stored in the database may be used to provide various kinds of services in relation to the above-described embodiments of the present disclosure. For example, if a user executes an image viewer application to view images such as pictures, and selects a specific face included in the images, information corresponding to the selected face may be extracted from the database and displayed on a screen.

The present disclosure has been described with specified matters such as specific components, limited embodiments, and drawings. However, these are provided to help easy understanding of the present invention, and the present invention is not limited to the embodiments. It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

The invention claimed is:

1. A method for displaying an image in an electronic device, comprising:

sequentially displaying, by the electronic device, a set of images, wherein images in the set of images are individually displayed in response to a plurality of first user inputs;

detecting, by the electronic device, a selection of an object included in a specific image in the set of images based on a second user input, wherein the specific image is displayed on a screen of the electronic device when the selection is detected;

identifying, by the electronic device, a plurality of images including the object in the set of images, wherein the set of images includes at least one image in which the object is absent; and displaying in a sequence, by the electronic device, each image of the plurality of images in response to another plurality of first user inputs, so that the at least one image in which the object is absent is skipped in the sequence for display.

2. The method of claim 1, further comprising displaying, on the screen, the at least one image in which the object is absent in response to a third user input, wherein the second user input and the third user input are inputted through a user interface.

3. The method of claim 2, wherein the user interface includes a menu window including input components for the second user input and the third user input.

4. The method of claim 1, further comprising storing, in a storage unit, an indication of an order in which the plurality of images are to be displayed, the indication being stored when the object is selected.

5. The method of claim 1, further comprising:
storing, in a storage unit, a mapping between the object and the plurality of images; and
wherein the plurality of images are displayed based on the mapping.

6. The method of claim 1, further comprising:
detecting the object and at least one other object in the specific image; and
displaying a respective marker for each of the detected object and the detected at least one other object, wherein the selection of the object is detected in response to the second user input being performed on the respective marker for the object.

7. The method of claim 1, wherein the object includes one of a human face, a human body, a part of a human body, an object that a person possesses, an object that a person wears, an animal, a building, a part of a building, a tree, an object fixed on a background of the specific image, and a movable object.

8. An electronic device comprising:
a display unit;
a memory; and
at least one processor operatively coupled to the memory, configured to:
sequentially display a set of images, wherein images in the set of images are individually displayed in response to a plurality of first user inputs, on the display unit;
detect a selection of an object included in a specific image in the set of images based on a second user input, wherein the specific image is displayed on a screen of the electronic device when the selection is detected;
identify a plurality of images including the object in the set of images, wherein the set of images includes at least one image in which the object is absent; and
display in a sequence each image of the plurality of images in response to another plurality of first user inputs, wherein the at least one image in which the object is absent is skipped in the sequence for display.

9. The electronic device of claim 8, wherein the at least one processor is further configured to store in the memory an indication of an order in which the plurality of images are to be displayed, the indication being stored when the object is selected.

10. The electronic device of claim 8, wherein the at least one processor is further configured to:
store in the memory a mapping between the object and the plurality of images; and
sequentially display, on the display unit, the plurality of images based on the mapping, in response to the other plurality of first user inputs.

11. The electronic device of claim 8, wherein:
the at least one processor is further configured to detect the object and at least one other object in the specific image, and display a respective marker for each of the detected object and the detected at least one other object,
wherein the selection of the object is detected in response to the second user input being performed on the respective marker for the object.

\* \* \* \* \*